（12) United States Patent
Tanaka

(10) Patent No.: US 10,211,719 B2
(45) Date of Patent: Feb. 19, 2019

(54) POWER CONVERTER

(71) Applicant: Mitsubishi Electric Corporation, Tokyo (JP)

(72) Inventor: Yuya Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/551,635

(22) PCT Filed: Mar. 3, 2015

(86) PCT No.: PCT/JP2015/056180
§ 371 (c)(1),
(2) Date: Aug. 17, 2017

(87) PCT Pub. No.: WO2016/139745
PCT Pub. Date: Sep. 9, 2016

(65) Prior Publication Data
US 2018/0041108 A1    Feb. 8, 2018

(51) Int. Cl.
*H02M 1/08* (2006.01)
*H02M 3/155* (2006.01)
(Continued)

(52) U.S. Cl.
CPC ........... *H02M 1/083* (2013.01); *H02M 3/155* (2013.01); *H02M 3/28* (2013.01); *H02M 3/3374* (2013.01);
(Continued)

(58) Field of Classification Search
CPC .......... H02M 1/08; H02M 1/083; H02M 1/42; H02M 1/4241; H02M 3/335;
(Continued)

(56) References Cited

U.S. PATENT DOCUMENTS 6,175,511 B1 * 1/2001 Ooba ............... H02J 9/062
307/66
2003/0142513 A1    7/2003 Vinciarelli
(Continued)

FOREIGN PATENT DOCUMENTS

EP    1 333 564 A2    8/2003
EP    1333564 A3    11/2004
(Continued)

OTHER PUBLICATIONS

International Search Report for PCT/JP2015/056180 dated Apr. 7, 2015.
(Continued)

*Primary Examiner* — Matthew V Nguyen
(74) *Attorney, Agent, or Firm* — Sughrue Mion, PLLC; Richard C. Turner

(57) ABSTRACT

An electric power converter is provided, at low costs and in high efficiency, which also enables voltage conversion to be capable of dealing with sharp load variation, even when input voltage and output current ranges are wide. The converter includes a non-isolated buck-boost converter circuit for outputting a DC voltage by increasing or decreasing a voltage being inputted into the circuit, an isolated converter circuit for outputting a DC voltage to a load by inputting a DC voltage outputted from the non-isolated buck-boost converter circuit, and a control unit for controlling the non-isolated buck-boost converter circuit and the isolated converter circuit, whereby the control unit adjusts using only the non-isolated buck-boost converter circuit, by performing the control of a buck-boost voltage ratio between the voltage inputted thereinto and an output voltage of the isolated converter circuit, so as to make the output voltage coincident with its target value.

23 Claims, 24 Drawing Sheets

(51) Int. Cl.
*H02M 3/28* (2006.01)
*H02M 3/335* (2006.01)
*H02M 3/337* (2006.01)
*H02M 1/00* (2006.01)

(52) U.S. Cl.
CPC ............... *H02M 3/33523* (2013.01); *H02M 2001/0058* (2013.01)

(58) Field of Classification Search
CPC ......... H02M 3/33507; H02M 3/33523; H02M 2001/0048; H02M 2001/0058
See application file for complete search history.

(56) References Cited

U.S. PATENT DOCUMENTS

| | | |
|---|---|---|
| 2003/0227280 A1 | 12/2003 | Vinciarelli |
| 2004/0174147 A1 | 9/2004 | Vinciarelli |
| 2004/0183513 A1 | 9/2004 | Vinciarelli |
| 2004/0184289 A1 | 9/2004 | Vinciarelli |
| 2005/0286271 A1 | 12/2005 | Vinciarelli |
| 2006/0244430 A1 | 11/2006 | Hirabayashi |
| 2009/0016083 A1 | 1/2009 | Soldano et al. |
| 2009/0085543 A1 | 4/2009 | Sigamani et al. |
| 2013/0058134 A1 | 3/2013 | Yamada et al. |
| 2013/0336017 A1 | 12/2013 | Uno et al. |
| 2014/0098574 A1 | 4/2014 | Hara et al. |
| 2014/0369076 A1* | 12/2014 | Cho .................. H02M 3/3376 363/17 |
| 2016/0094047 A1* | 3/2016 | Finkenzeller ........... H02J 50/05 307/104 |
| 2016/0329830 A1* | 11/2016 | Hussain ................ H02M 7/537 |
| 2017/0353111 A1* | 12/2017 | Elasser ................. H02M 1/08 |

FOREIGN PATENT DOCUMENTS

| | | |
|---|---|---|
| JP | 07-337001 A | 12/1995 |
| JP | 2004-096826 A | 3/2004 |
| JP | 2004159485 A | 6/2004 |
| JP | 2008-099471 A | 4/2008 |
| JP | 2013-258860 A | 12/2013 |
| JP | 2014-220862 A | 11/2014 |
| WO | 2011/151940 A1 | 12/2011 |
| WO | 2012/153799 A1 | 11/2012 |

OTHER PUBLICATIONS

Communication dated Dec. 19, 2017 from the Japanese Patent Office in counterpart application No. 2017-503248.
Communication dated Oct. 10, 2017 from the Japanese Patent Office in counterpart Japanese application No. 2017-503248.
Communication dated Oct. 9, 2018 from the European Patent Office in counterpart application No. 15883913.4.
Beiranvand et al., "Optimizing the Normalized Dead-Time and Maximum Switching Frequency of a Wide-Adjustable-Range LLC Resonant Converter", IEEE Transactions on Power Electronics, vol. 26, No. 2, Feb. 2011, pp. 462-472.
ON Semiconductor, "Secondary Side Synchronous Rectification Driver for High Efficiency SMPS Topologies", Jun. 30, 2011, Retrieved from the internet: URL: http://elcodis.com/parts/4619656/NCP4303ADR2G.html#datasheet, pp. 1-29.
Kosmodamianskii et al., "Control System of a Tractive Drive with Temperature Control of Thermally Loaded Elements", Russian Electrical Engineering, vol. 85, No. 8, 2014, pp. 513-518.
Communication dated Dec. 5, 2018 issued by the Chinese Patent Office in counterpart application No. 201580076954.3.

* cited by examiner

POWER CONVERTER

CROSS REFERENCE TO RELATED APPLICATIONS

This application is a National Stage of International Application No. PCT/JP2015/056180 filed Mar. 3, 2015, the contents of all of which are incorporated herein by reference in their entirety.

BACKGROUND OF THE INVENTION

Field of the Invention

The present invention relates to an electric power converter whose converter circuits each for converting an inputted DC voltage into a predetermined DC voltage are configured in a succession of two stages.
Description of the Related Art

BACKGROUND ART

In Japanese Laid-Open Patent Publication No. 2013-258860, a DC-DC converter is disclosed in its configuration including upstream thereof a non-isolated converter for stepping up or boosting a voltage from an input power source, and including downstream thereof an isolated bridge converter. The upstream non-isolated converter detects an output voltage, and controls so that an input voltage to the downstream isolated bridge converter becomes constant. The downstream isolated bridge converter operates at a fixed switching frequency and also a fixed ON-duty ratio so that a voltage in which the input voltage is multiplied by a turn ratio becomes the output voltage. In the configuration of Japanese Laid-Open Patent Publication No. 2013-258860, it has been possible to operate an isolated bridge converter at an operating point in which its efficiency is best, because the upstream non-isolated converter maintains the input voltage of the downstream isolated bridge converter to be constant even when a voltage of the input power source varies.

PROBLEMS TO BE SOLVED BY THE INVENTION

However, in the configuration of Japanese Laid-Open Patent Publication No. 2013-258860, it has been impossible to decrease the output voltage lower than a voltage in which the input voltage is multiplied by a turn ratio, because the upstream non-isolated converter is a step-up or boost converter which can only achieve stepping up or boosting a voltage. There arises a problem in that, in a case in which a capacity load of a battery or the like is connected on an output side and when a voltage of the load becomes lower than a voltage in which an input voltage is multiplied by a turn ratio, an electric current control cannot be performed, so that a short-circuit current results in flowing through the non-isolated converter and the isolated bridge converter.

In addition, in order not to allow the short-circuit current flowing therethrough, it is suitable that an output voltage of a non-isolated converter is made higher so that the non-isolated converter is designed to always perform stepping up or boosting the voltage; however, a voltage applied across each of the devices increases, and so a device's withstand voltage should be heightened, causing a problem in occurrence of efficiency reduction and higher costs. When a range(s) of input-output voltages is wide, it further gives impetus to efficiency reduction and higher costs.

The present invention has been directed at solving such problems as described above, and an object of the invention is to provide an electric power converter which is low in costs and high in efficiency, and can deal with a wide input-output voltage range.

SUMMARY OF THE INVENTION

Means for Solving the Problems

An electric power converter according to the present invention comprises: a non-isolated buck-boost converter circuit for outputting, by increasing or decreasing a voltage being inputted thereinto, a DC voltage; an isolated converter circuit for outputting a DC voltage to a load by inputting a DC voltage outputted from the non-isolated buck-boost converter circuit; and a control unit for controlling the non-isolated buck-boost converter circuit and the isolated converter circuit.

Effects of the Invention

According to the present invention, it becomes possible to obtain an electric power converter which is low in costs and high in efficiency, and can deal with a wide input-output voltage range, without heightening withstand voltages of the devices used for the converter circuits. In addition, because the upstream non-isolated converter circuit can increase or decrease its voltage, it is also possible to decrease the output voltage to 0 V.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
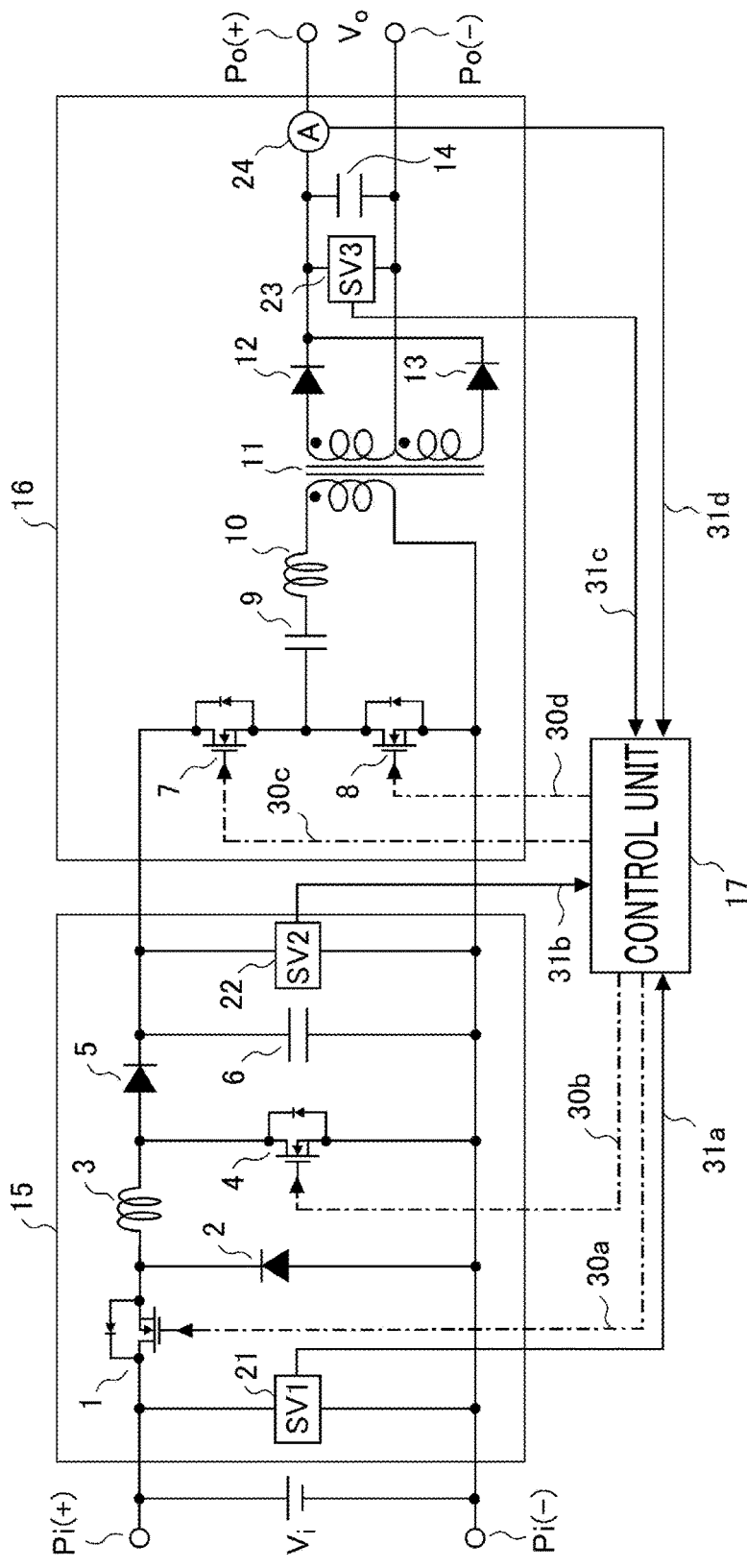
FIG. 1 is a schematic configuration diagram of an electric power converter according to Embodiment 1 of the present invention.

Hereinafter, electric power converters according to the embodiments of the present invention will be described referring to the drawings according to preferred exemplary embodiments. Note that, in the explanation of the drawings, the same reference numerals and symbols designate the same items as, or the items corresponding to, those shown in the drawings; thus, their explanation redundant thereto is appropriately omitted.

Embodiment 1

First, the explanation will be made referring to FIG. 1 through FIG. 9 for an electric power converter according to Embodiment 1 of the present invention. FIG. 1 is a schematic configuration diagram illustrating the electric power converter according to Embodiment 1; in FIG. 1, the electric power converter is a converter configured in a succession of two stages in which a non-isolated buck-boost converter circuit 15 is placed upstream of an isolated converter circuit 16 being an LLC (two inductors (LL) and a capacitor (C)) resonance converter. It is so arranged that an input voltage (DC voltage) Vi from input terminals Pi is stepped up or stepped down so as to be converted into an arbitrary DC voltage by means of the non-isolated buck-boost converter circuit 15; then, this DC voltage is inputted into the isolated converter circuit 16, and is thereby outputted at output terminals Po as an output voltage (DC voltage) Vo, which is supplied to a load not shown in the figure.

The non-isolated buck-boost converter circuit 15 is constituted of a first semiconductor switching device 1, a diode 2, a smoothing reactor 3, a second semiconductor switching device 4, a diode 5 and a smoothing capacitor 6.

As for the first semiconductor switching device 1, its drain terminal is connected on a positive electrode side of the input voltage Vi at the input terminals Pi, and the source terminal is connected to a connection point between the smoothing reactor 3 and the diode 2. As for the diode 2, its anode terminal is connected on a negative electrode side to the input voltage Vi at the input terminals Pi and on a negative electrode side of the smoothing capacitor 6, and the cathode terminal is connected to a connection point between the first semiconductor switching device 1 and the smoothing reactor 3.

As for the second semiconductor switching device 4, its drain terminal is connected to the smoothing reactor 3, and the source terminal is connected on the negative electrode side to the input voltage Vi at the input terminals Pi and on the negative electrode side of the smoothing capacitor 6. As for the diode 5, its anode terminal is connected to a connection point between the smoothing reactor 3 and the second semiconductor switching device 4, and the cathode terminal is connected on a positive electrode side of the smoothing capacitor 6. A control unit 17 performs the turn-on and turn-off control on the first semiconductor switching device 1 and on the second semiconductor switching device 4, and adjusts a voltage of the smoothing capacitor 6 at an arbitrary value.

The isolated converter circuit 16 connects the non-isolated buck-boost converter circuit 15 downstream thereof, and includes, on a primary side of a transformer 11, third and fourth semiconductor switching devices 7 and 8, a resonance capacitor 9 and a resonance reactor 10 made of a leakage inductance of the transformer 11. On a secondary side of the transformer 11, included are diodes 12 and 13 which form a rectifier circuit, and a smoothing capacitor 14 between the output terminals Po from which an output voltage Vo of direct current is outputted.

A drain terminal of the third semiconductor switching device 7 is connected on the positive electrode side of the smoothing capacitor 6 of the non-isolated buck-boost converter circuit 15; and a source terminal of the fourth semiconductor switching device 8 is connected on the negative electrode side of the smoothing capacitor 6. A source terminal of the third semiconductor switching device 7 and a drain terminal of the fourth semiconductor switching device 8 are mutually connected to one end of the resonance capacitor 9. The resonance capacitor 9, the resonance reactor 10 and the transformer 11 are connected in series to each other, and are connected between the connection point of the source terminal of the third semiconductor switching device 7 and that of the drain terminal of the fourth semiconductor switching device 8, and the source terminal of the fourth semiconductor switching device 8.

In FIG. 1, the connection is made in order of, from the connection point between the source terminal of the third semiconductor switching device 7 and the drain terminal of the fourth semiconductor switching device 8, the resonance capacitor 9→the resonance reactor 10 being a leakage inductance of the transformer 11→and a primary winding of the transformer 11; however, it is not necessarily limited to this. It may be adopted that the resonance capacitor 9 is connected between the transformer 11 and the source terminal of the fourth semiconductor switching device 8.

On a secondary winding side of the transformer 11, the diode 12 and the diode 13 are included; the secondary winding of the transformer 11 has an intermediate tap, and the intermediate tap is connected on the negative electrode side at the output terminals Po; at both ends of the secondary winding of the transformer 11, respective anode terminals of the diodes 12 and 13 are connected; and the cathode terminal of the diode 12 and the cathode terminal of the diode 13 are connected to each other, whose connection point is connected on the positive electrode side at the output terminals Po.

It is so arranged that an input-voltage detection circuit 21 is connected in parallel with the input terminals Pi, and a voltage value of an input voltage (DC voltage) Vi is acquired from the input terminals Pi. It is so arranged that a smoothing-capacitor-voltage detection circuit 22 is connected in parallel with the smoothing capacitor 6, and a voltage value of an output voltage Vc of the non-isolated buck-boost converter circuit 15 is acquired. It is so arranged that an output-voltage detection circuit 23 is connected in parallel with the output terminals Po, and a voltage value of an output voltage (DC voltage) Vo being an output from the isolated converter circuit 16 is acquired. It is also arranged that an output-current detection circuit 24 is connected on the positive electrode side at the output terminals Po, and an output current is detected.

The control unit 17 performs the turn-on and turn-off control on the first through fourth semiconductor switching devices 1, 4, 7 and 8 by way of control lines 30a, 30b, 30c and 30d, respectively. The control unit 17 acquires detected values of voltage from the input-voltage detection circuit 21, the smoothing-capacitor-voltage detection circuit 22 and the output-voltage detection circuit 23 by way of signal lines 31a, 31b and 31c, respectively. In addition, the control unit acquires a detected value of output current from the output-current detection circuit 24 by way of a signal line 31d.

First, the explanation will be made for operation principles of the non-isolated buck-boost converter circuit 15 in the electric power converter according to Embodiment 1. The non-isolated buck-boost converter circuit 15 of FIG. 1 differs in switching patterns at a time of a step-down or buck operation, and at a time of a step-up or boost operation.

Figure 2:
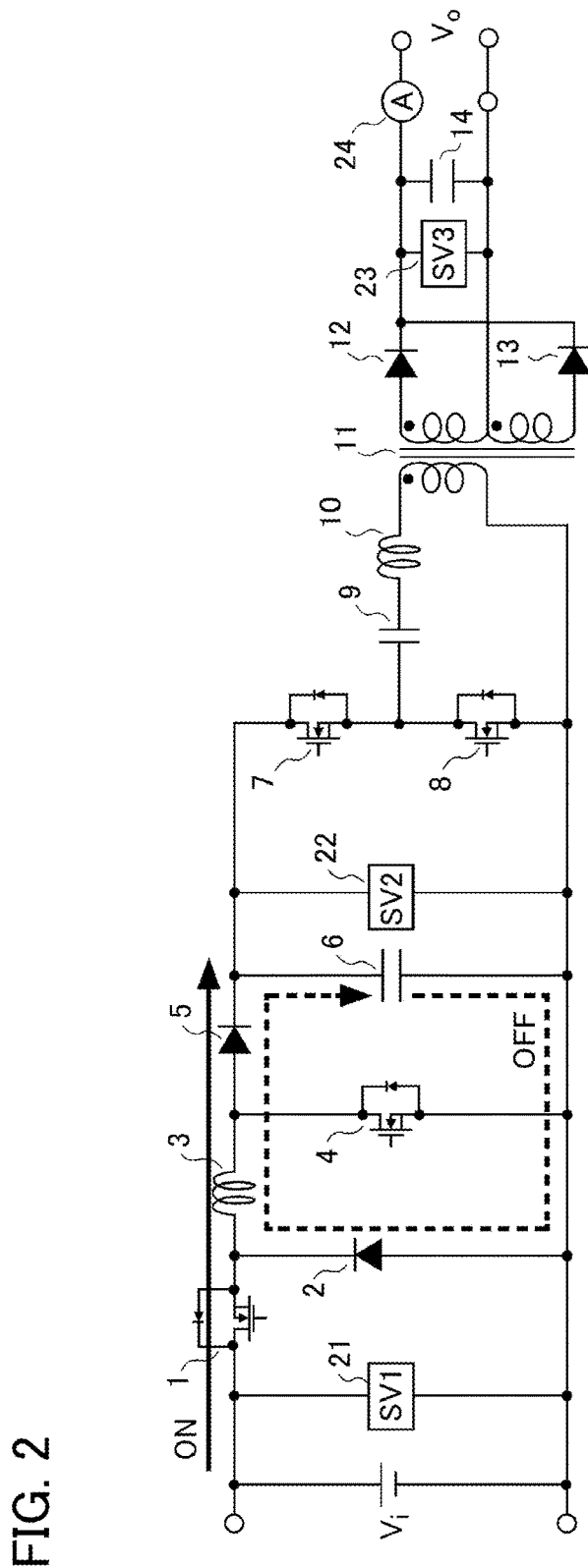
FIG. 2 is an illustrative diagram for explaining an electric current path when a control unit turns on or off a first semiconductor switching device in the electric power converter according to Embodiment 1 of the present invention.

At a time of a buck operation, electric current paths pass through as in FIG. 2 by performing the turn-on and turn-off control on the first semiconductor switching device 1 and by continuously turning off (turning off at all times) the second semiconductor switching device 4. In FIG. 2, when the first semiconductor switching device 1 is turned on, an electric current flows therethrough in such a way indicated with the solid-line arrow; and when the first semiconductor switching device 1 is turned off, an electric current flows through in such a way indicated with the broken-line arrow.

Figure 3:
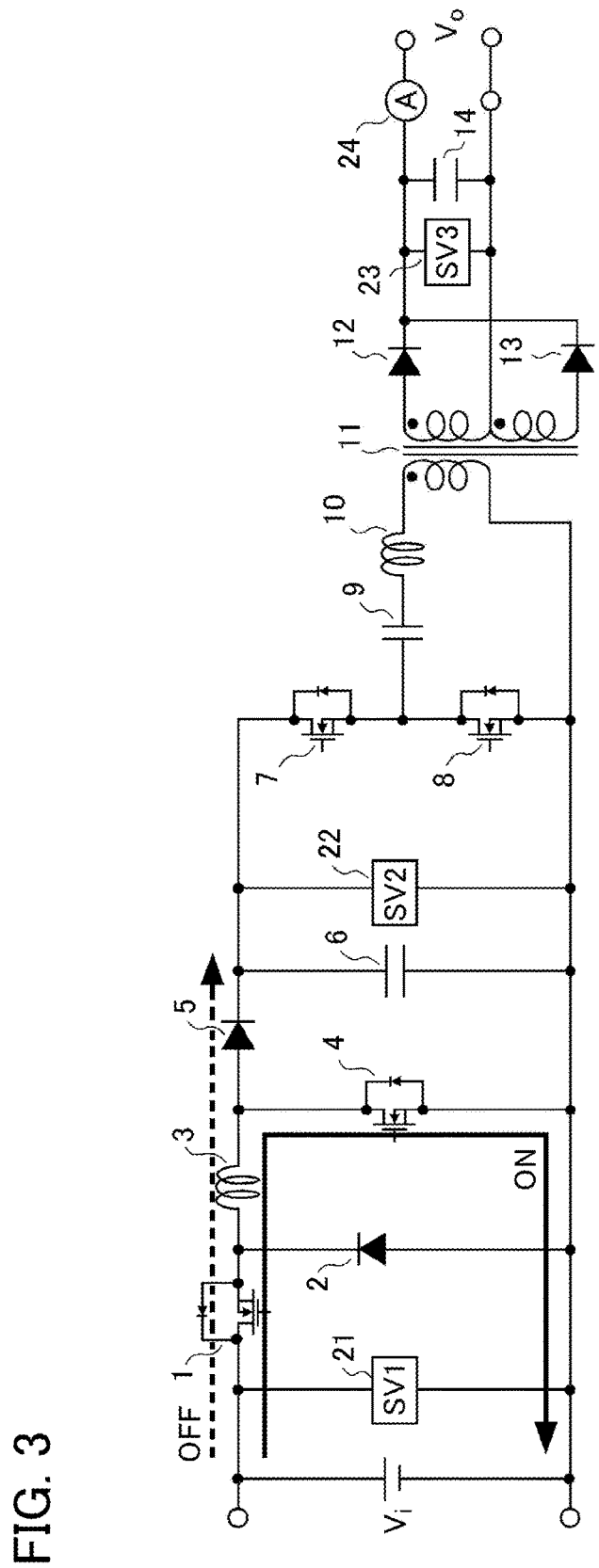
FIG. 3 is an illustrative diagram for explaining an electric current path when the control unit turns on or off a second semiconductor switching device in the electric power converter according to Embodiment 1 of the present invention.

At a time of a boost operation, electric current paths pass through as in FIG. 3 by continuously turning on (turning on at all times) the first semiconductor switching device 1 and by performing the turn-on and turn-off control on the second semiconductor switching device 4. In FIG. 3, when the second semiconductor switching device 4 is turned on, an electric current flows therethrough in such a way indicated with the solid-line arrow; and when the second semiconductor switching device 4 is turned off, an electric current flows through in such a way indicated with the broken-line arrow.

The control unit 17 controls an output voltage of the non-isolated buck-boost converter circuit 15, and adjusts the output voltage Vo of the isolated converter circuit 16 so that it approaches a target value.

Next, the explanation will be made for the isolated converter circuit 16. The control unit 17 performs the turn-on and turn-off control on the respective third and fourth semiconductor switching devices 7 and 8. The third and fourth semiconductor switching devices 7 and 8 are alternately turned on, in more detail, at a duty ratio of approximately 50% interposing a dead time, and also at a switching frequency fsw having half a period as a time in which the dead time is added to half a period of a series resonance frequency fsr of a series resonance circuit constituted of the resonance capacitor 9 and the resonance reactor 10 being a leakage inductance of the transformer 11.

Figure 4:
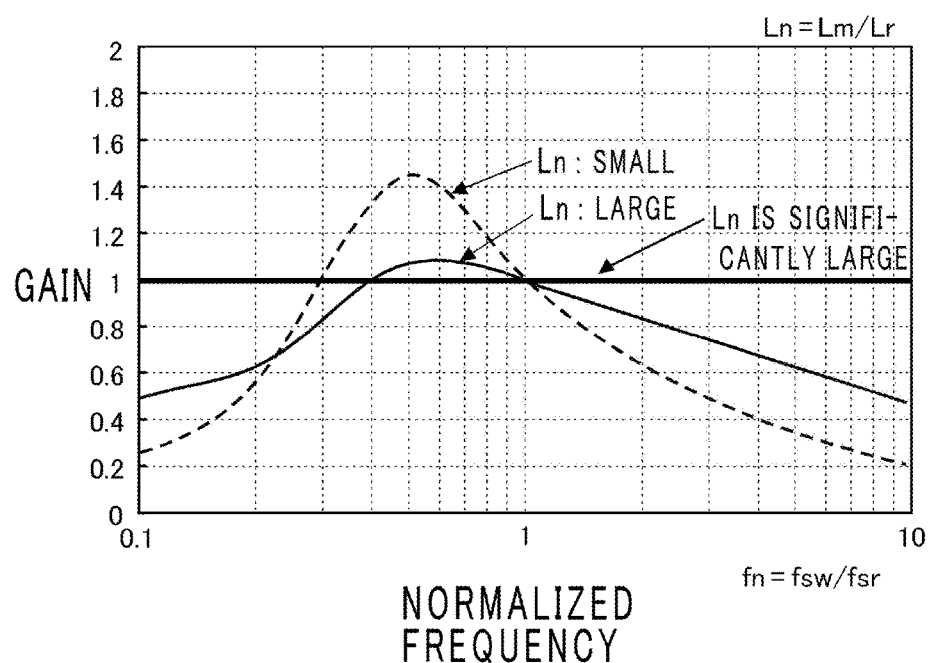
FIG. 4 is an illustrative diagram for explaining the relationship between a switching frequency of an isolated converter circuit and a gain thereof in the electric power converter according to Embodiment 1 of the present invention.

Here, the explanation will be made for the relationship between a frequency and a gain. The isolated converter circuit 16 being an LLC resonance converter determines a voltage applied to the transformer 11 by controlling a switching frequency, thereby adjusting the impedance of the series resonance circuit. In accordance with an inductance ratio Ln (=Lm/Lr) determined by an exciting inductance Lm of the transformer 11, and a leakage inductance Lr being the resonance reactor 10 of the transformer 11, a value of gain changes under the same load condition. In FIG. 4, the relationship between the inductance ratio Ln and a gain is shown.

In FIG. 4, the horizontal axis indicates a frequency, and the vertical axis, a gain; the figure depicts that the gain changes depending on the magnitude of the inductance ratio Ln. As is clear from FIG. 4, the larger an inductance ratio Ln becomes, the more difficult a gain changes in accordance with a switching frequency; and when the inductance ratio Ln is significantly large, the gain becomes constant without relating to the switching frequency.

As described above, in general, when a leakage inductance of the transformer 11 is used for the resonance reactor 10, the inductance ratio Ln becomes larger because a leakage inductance Lr is smaller than an exciting inductance Lm of the transformer 11, so that the gain is difficult to change.

For this reason, by adjusting an output voltage of the non-isolated buck-boost converter circuit 15 and by fixing an input voltage of the isolated converter circuit 16 (≅a voltage across the smoothing capacitor 6), this problem is solved; and also, in general, there exists in the resonance reactor 10 no iron loss nor copper loss which is caused if the resonance reactor utilizes an external component, resulting in leading to achieve increased efficiency. In addition, because the switching frequency is fixed, an output voltage Vo is caused to vary depending on a voltage Vc of the smoothing capacitor 6; however, the output voltage Vc is adjusted by the non-isolated buck-boost converter circuit 15, and the control is performed so that the output voltage Vo approaches its target value.

The control unit 17 adjusts an output voltage of the non-isolated buck-boost converter circuit 15 so that a voltage value of the output-voltage detection circuit 23 acquired by way of the signal line 31c approaches a target value. Here, the explanation will be made by exemplifying for specific control methods.

When a voltage across the smoothing capacitor 6 at an output-circuit portion of the non-isolated buck-boost converter circuit 15 is given as Vc, and turn ratios of the transformer 11 are given as N:1:1, Equation (1) is held as follows.

[Equation Figure-1]

$$Vo = \frac{1}{2} \times \frac{1}{N} \times Vc \quad (1)$$

In accordance with Equation (1), when a target value of the output voltage Vo is given as Vo*, a control target-value Vc* for a voltage across the smoothing capacitor 6 at the output-circuit portion of the non-isolated buck-boost converter circuit 15 can be given as Equation (2).

$$Vc^* = 2 \times N \times Vo^* \quad (2)$$

The non-isolated buck-boost converter circuit 15 is a circuit which converts an input voltage Vi into a voltage Vc. At a time of a buck operation, Equation (3) is held when an ON-duty $D_1$ of the first semiconductor switching device 1 is used.

$$Vc = D_1 \times Vi \quad (3)$$

Similarly, at a time of a boost operation, Equation (4) is held when an ON-duty $D_4$ of the second semiconductor switching device 4 is used.

[Equation Figure-2]

$$Vc = \frac{Vi}{1 - D_4} \quad (4)$$

Accordingly, in order to achieve that a control target-value for the non-isolated buck-boost converter circuit 15 obtained by Equation (2) approaches a Vc*, a duty ratio of the first semiconductor switching device 1 is controlled at a time of a buck operation; and a duty ratio of the second semiconductor switching device 4, at a time of a boost operation.

According to the above, the control unit 17 controls the duty ratios of the first and second semiconductor switching devices 1 and 4 so that an output voltage Vo follows after its target value Vo*, and adjusts an output voltage of the non-isolated buck-boost converter circuit 15 (≅a voltage Vc across the smoothing capacitor 6).

The aforementioned manner is the control method of an output voltage of the non-isolated buck-boost converter circuit 15. Under actual circumstances, there is a case in which, due to a voltage drop of each of circuit devices of the isolated converter circuit 16, a sensor error of each of the voltage detection circuits and the like, the output voltage Vo of the isolated converter circuit 16 is lower (or higher) than a target value Vo*, even when an output voltage of the non-isolated buck-boost converter circuit 15 is controlled.

At this time, when a target value of an output voltage Vo is given as Vo* and a voltage value acquired by the output-voltage detection circuit 23, as Vo_mon, the control is performed in such a manner that, with respect to the difference ΔVo toward a target value of the output voltage Vo determined by Equation (5) expressed below, the output voltage Vo of the isolated converter circuit 16 finally becomes the target value Vo* by adding, to a control target-value Vc* of the non-isolated buck-boost converter circuit 15, a value to which a proportional gain and an integral gain are added.

$$\Delta Vo = (Vo^* - Vo\_mon) \quad (5)$$

Hereinbefore, the explanation has been made for an example in which an output voltage Vc of the non-isolated buck-boost converter circuit 15 is controlled; however, it is not necessarily limited to this. It may be adopted that, for example, the control unit 17 controls an output voltage of the non-isolated buck-boost converter circuit 15 without performing feedback of the output voltage Vc so that an output voltage Vo of the isolated converter circuit 16 approaches its target value Vo*.

Figure 5:
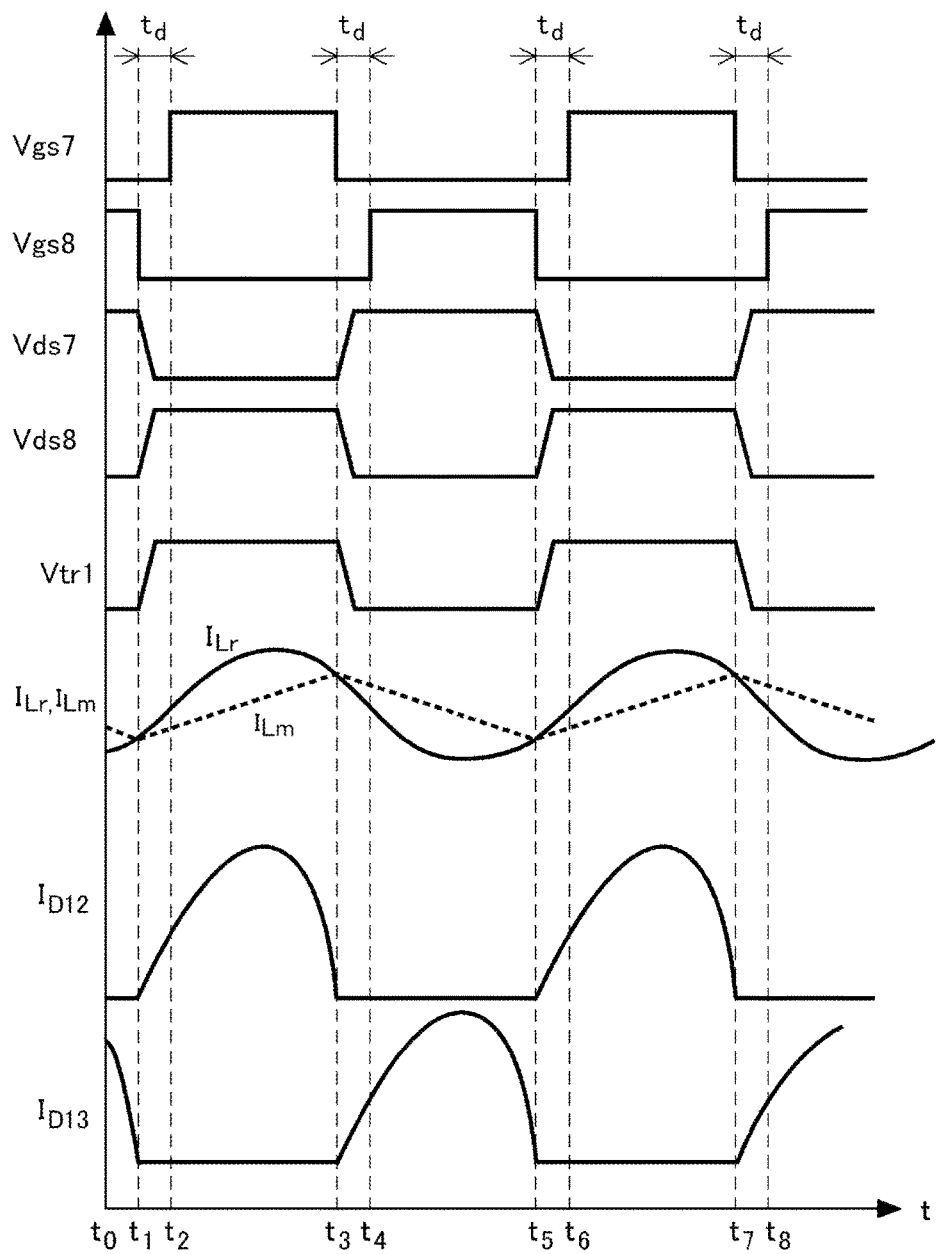
FIG. 5 is an illustrative diagram for explaining each of voltage and current waveforms in operation of the isolated converter circuit in the electric power converter according to Embodiment 1 of the present invention.

Next, the explanation will be made referring to waveforms for basic operations of the isolated converter circuit 16. FIG. 5 is a diagram showing each of voltage and current waveforms in operation of the isolated converter circuit 16 of the electric power converter according to Embodiment 1.

In FIG. 5, the horizontal axis indicates an axis of time. The times t2 and t6 are timings when the third semiconductor switching device 7 turns on, and the times t3 and t7 are those when the third semiconductor switching device 7 turns off. In addition, the times t1 and t5 are timings when the fourth semiconductor switching device 8 turns off, and the times t4 and t8 are those when the fourth semiconductor switching device 8 turns on. Moreover, between the timings at which the respective third and fourth semiconductor switching devices 7 and 8 turn on/off, a dead time td is interposed.

In addition, FIG. 5 shows each of the waveforms for a gate voltage Vgs7 applied between the gate of the third semiconductor switching device 7 and the source thereof, a gate voltage Vgs8 applied between the gate of the fourth semiconductor switching device 8 and the source thereof, a voltage Vds7 applied between the drain of the third semiconductor switching device 7 and the source thereof, a voltage Vds8 applied between the drain of the fourth semiconductor switching device 8 and the source thereof, a voltage Vtr1 applied on the primary side of the transformer 11, an electric current flowing through the resonance capacitor 9 and the resonance reactor 10 (a leakage inductance of the transformer 11) $I_{Lr}$ (hereinafter referred to as a "resonance current"), an exciting current $I_{Lm}$ flowing through an exciting inductance Lm of the transformer 11, and electric currents $I_{D12}$ and $I_{D13}$ flowing through the respective rectifier diodes 12 and 13 on the secondary side of the transformer 11. Note that, in an electric current flowing through the primary side of the transformer 11, a direction of the current flowing from the resonance capacitor 9 into the transformer 11 is defined as positive.

FIG. 6A, FIG. 6B, FIG. 6C and FIG. 6D each shows a path(s) of electric current at times when the third and fourth semiconductor switching devices 7 and 8 of the isolated converter circuit 16 are turned on and/or off.

Figure 6A:
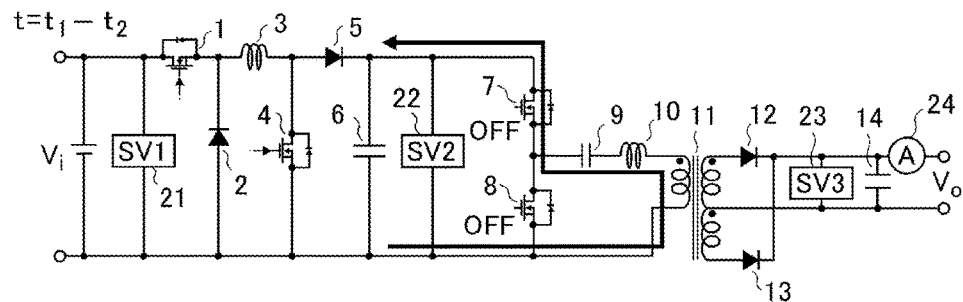
FIG. 6A, FIG. 6B, FIG. 6C and FIG. 6D are illustrative diagrams each for explaining an electric current path(s) when semiconductor switching devices of the isolated converter circuit are turned on and/or off in the electric power converter according to Embodiment 1 of the present invention.

As shown in FIG. 6A, immediately after the fourth semiconductor switching device 8 turns off at the times t1 to t2, a resonance current $I_{Lr}$ flows as an electric current through the path: the transformer 11 (including the resonance reactor 10)→the resonance capacitor 9→and the body diode of the third semiconductor switching device 7.

Figure 6B:
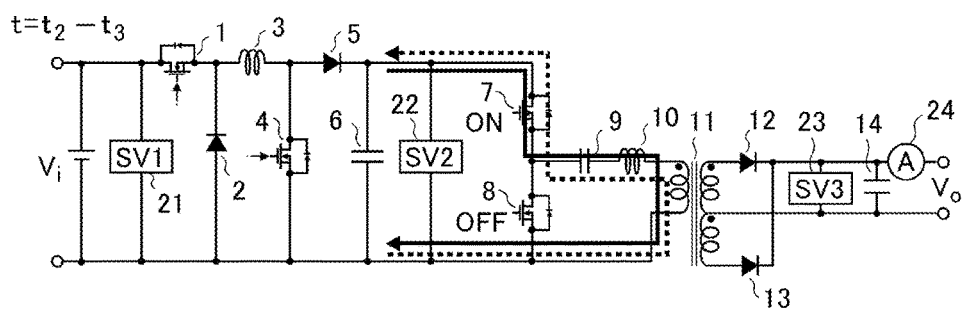

As shown in FIG. 6B, at the times t2 to t3 until immediately before then, an electric current has flowed through the body diode in the third semiconductor switching device 7, and thus, because a voltage Vds7 between the drain and the source is zero, ZVS (Zero Voltage Switch) is held on the third semiconductor switching device 7. The solid line in the figure designates the electric current path at the times t2 to t3; the broken line designates the electric current path of the resonance current $I_{Lr}$ which has flowed until immediately before then.

Figure 6C:
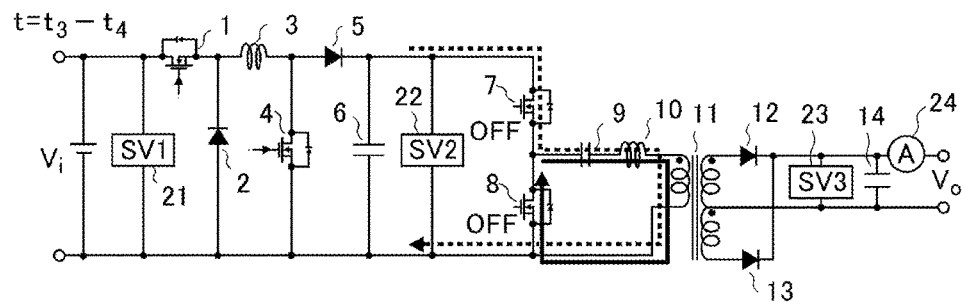

As shown in FIG. 6C, immediately after the third semiconductor switching device 7 turns off at the times t3 to t4, the resonance current $I_{Lr}$ flows as an electric current through the path: the resonance capacitor 9→the transformer 11 (including the resonance reactor 10)→and the body diode of the fourth semiconductor switching device 8.

Figure 6D:
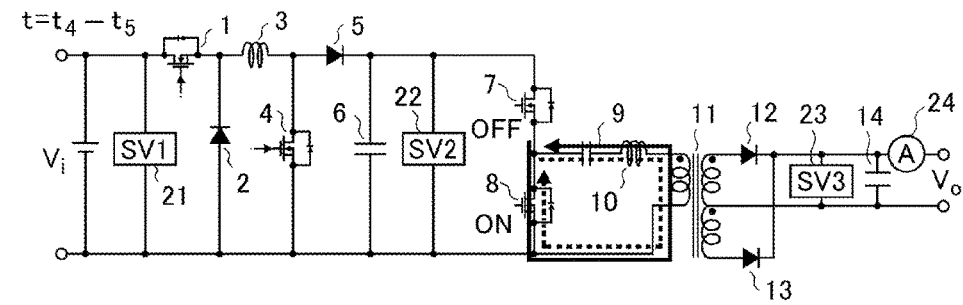

As shown in FIG. 6D, at the times t4 to t5 until immediately before then, an electric current has flowed through the body diode in the fourth semiconductor switching device 8, and thus, because a voltage Vds8 between the drain and the source is zero, the ZVS is held on the fourth semiconductor switching device 8. The solid line in the figure designates the electric current path at the times t4 to t5; the broken line designates the electric current path of the resonance current $I_{Lr}$ which has flowed until immediately before then.

In addition, a difference current between the resonance current $I_{Lr}$ and an exciting current $I_{Lm}$ flows into the secondary side of the transformer 11 though this is not shown in the figures; when the condition is $I_{Lr} > I_{Lm}$, an electric current $I_{D12}$ flows through the diode 12, and when the condition is $I_{Lm} > I_{Lr}$, an electric current $I_{D13}$ flows through the diode 13.

In Embodiment 1, the control is performed so that a switching frequency fsw is made equal to a frequency in which the amount for dead time td is added to a series resonance frequency fsr of a series resonance circuit constituted of the resonance reactor 10 and the resonance capacitor 9.

In general, it is recommended to perform the control to equalize in such a manner that a switching frequency fsw≅a series resonance frequency fsr; however, under actual circumstances, turn-off losses are caused because a semiconductor switching device turns off ahead of time by the amount of dead time td. For dealing therewith, in this embodiment, a switching frequency is determined so that half a period of a switching frequency (Tsw/2) is made equal to a time in which a dead time td is added to half a period of a series resonance frequency (Tsr/2). These relational expressions are given in Equations (6). When a secondary side rectifier circuit of the transformer 11 is in operation of synchronous rectification, the most efficient effects are exerted, as this will be described later.

[Equation Figure-3]

$$\frac{1}{fsr} = \frac{1}{fsw} - 2 \cdot td \qquad (6)$$

$$\therefore \frac{1}{2}Tsw = \frac{1}{2}Tsr + td$$

Figure 7:
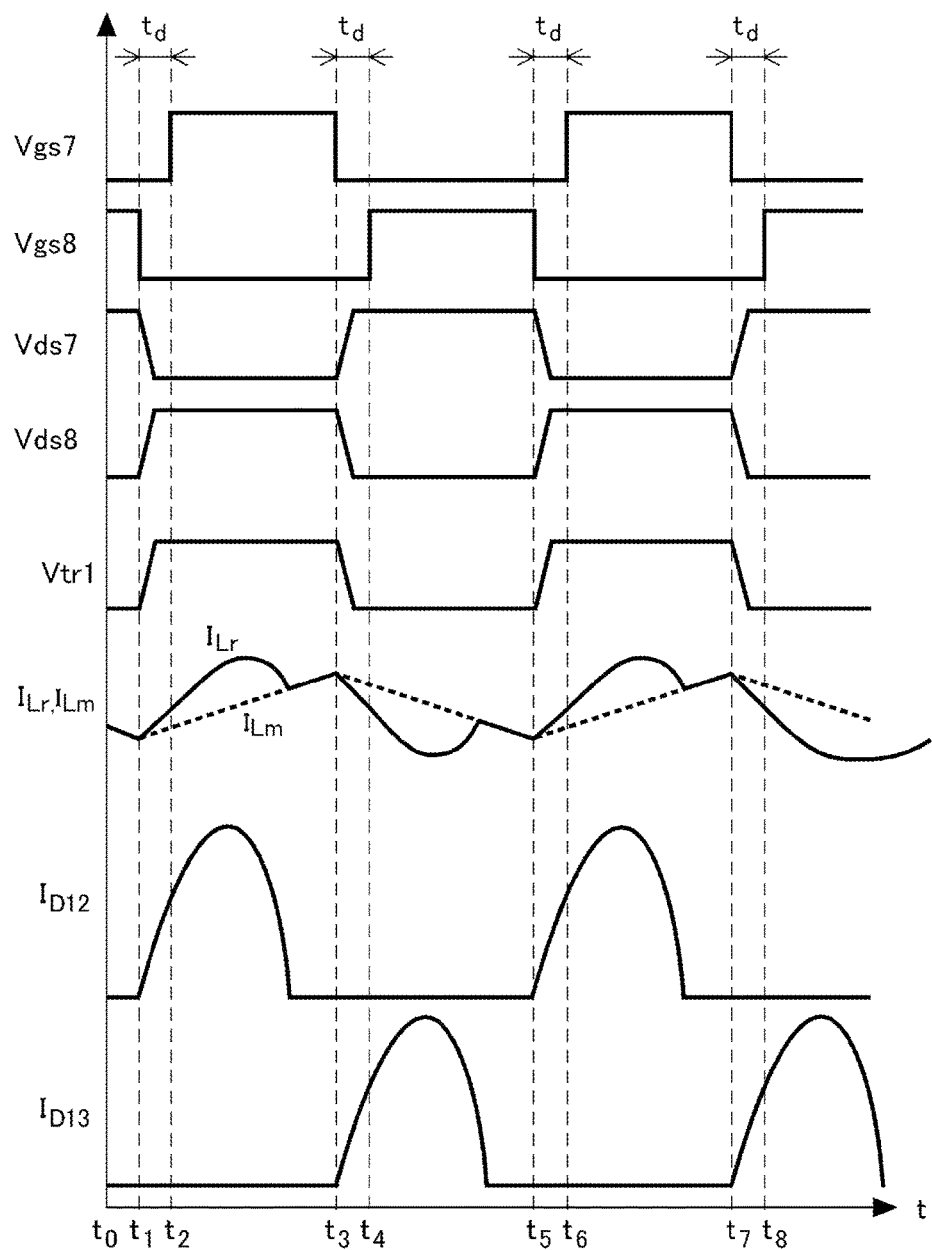
FIG. 7 is a diagram showing waveforms in a case in which a switching frequency of the semiconductor switching devices of the isolated converter circuit is set sufficiently lower than a series resonance frequency in the electric power converter according to Embodiment 1 of the present invention.
Figure 8:
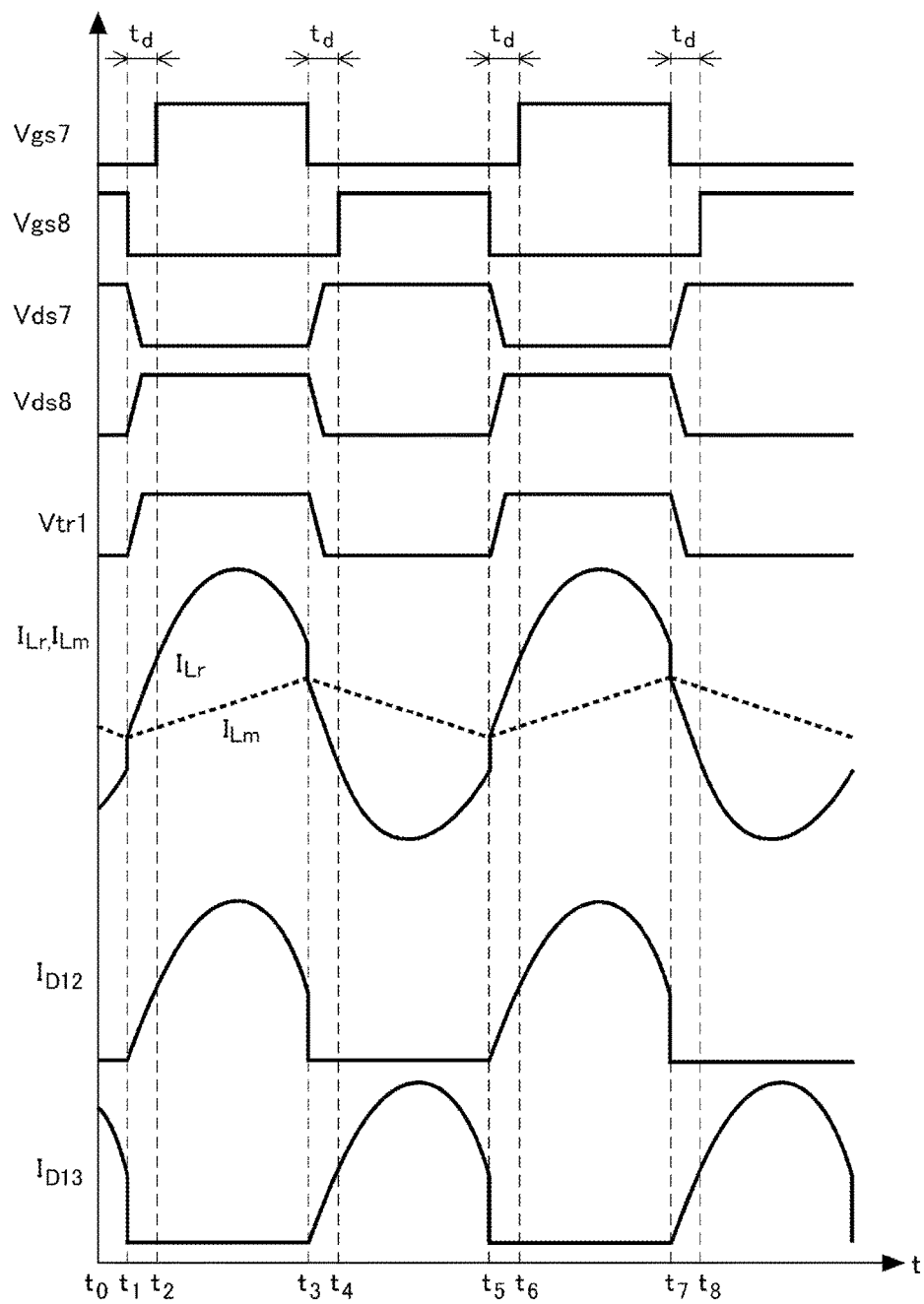
FIG. 8 is a diagram showing waveforms in a case in which the switching frequency of the semiconductor switching devices of the isolated converter circuit is set sufficiently higher than a series resonance frequency in the electric power converter according to Embodiment 1 of the present invention.

In what follows, for comparison purposes, waveforms are shown in FIG. 7 in a case in which a switching frequency fsw is set sufficiently lower than a series resonance frequency fsr; and waveforms are shown in FIG. 8 in a case in which the switching frequency fsw is set sufficiently higher than the series resonance frequency fsr.

According to the above, in comparison with those in FIG. 5, the ratio of time during which a resonance current $I_{Lr}$ flows becomes smaller when the switching frequency fsw is made lower, and thus, in order to output the electric power as same as that of FIG. 5 in the smaller ratio of time, a peak value of resonance current $I_{Lr}$ and a root-mean-square value of the current become larger, so that losses are increased. When the switching frequency fsw is made higher, hard switching is caused at turn-off timings t3, t5 and t7, so that losses are increased.

The aforementioned manners are the control methods of the non-isolated buck-boost converter circuit 15 and the isolated converter circuit 16. The electric power converter explained in Embodiment 1 converts an input voltage Vi to a predetermined voltage by means of the non-isolated buck-boost converter circuit so that the isolated converter circuit 16 can output approximately at a constant buck-boost voltage ratio. For this reason, in general, the closer the buck-boost voltage ratio is to 1, the higher the efficiency becomes.

In order to achieve increased efficiency when an input voltage Vi and a voltage in which the non-isolated buck-boost converter circuit 15 outputs are close to each other in a predetermined range, the control unit 17 continuously turns on the first semiconductor switching device 1 and continuously turns off the second semiconductor switching device 4, thereby allowing only the isolated converter circuit 16 to perform switching operations. According to this arrangement, excessive switching losses can be prevented, which leads to achieve increased efficiency.

When it is not required to transmit electric power to a load in such a case that an output voltage Vo is significantly higher than a target output-voltage value Vo*, or the like, the control unit 17 continuously turns off the first semiconductor switching device 1. According to this arrangement, superfluous electric power is eliminated to be transmitted to the load, so that it is prevented to cause that an output voltage Vo undergoes overvoltages.

The explanation has been made for the basic operations of the electric power converter according to Embodiment 1. Next, the explanation will be made for a control method at the time of variations of a load in its operations.

When an electric current of a load in its operations reaches an overcurrent threshold value, the electric power converter is required to perform protective operations (fail-safe) by a drooping characteristic or the like. In Embodiment 1, a sensor circuit (output-current detection circuit 24) for acquiring a value of output current of the isolated converter circuit 16 is included, and an output voltage of the non-isolated buck-boost converter circuit 15 is decreased when an electric current value at an output-circuit portion of the isolated converter circuit 16 exceeds a predetermined value.

Accordingly, the output voltage of the isolated converter circuit 16 is also decreased. By decreasing the output voltage of the isolated converter circuit 16, output power of the electric power converter is limited, so that the electric power converter is protected.

In addition, by controlling a switching frequency of the isolated converter circuit 16 based on an electric current from the output-current detection circuit 24, it is possible to suppress a root-mean-square value of resonance current, and to operate the isolated converter circuit 16 under the conditions to achieve the best efficiency even when a resonance frequency changes due to component variation, age degradation and the like.

Figure 9:
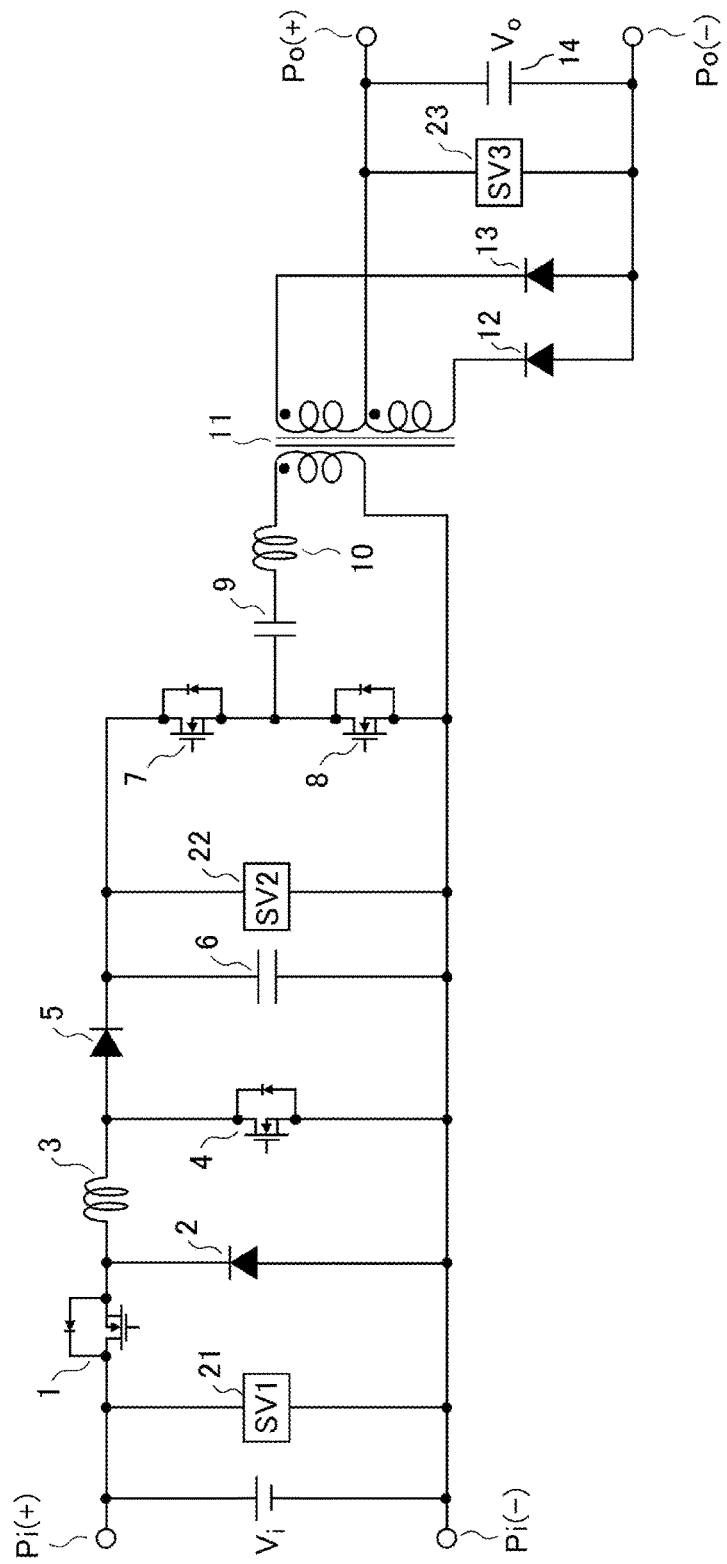
FIG. 9 is a configuration diagram of a modification example of the electric power converter according to Embodiment 1 of the present invention.

In Embodiment 1, the intermediate tap of the secondary winding of the transformer 11 is connected on the negative side at the output terminals Po, and anode terminals of the diodes 12 and 13 are individually connected to both ends on the secondary winding of the transformer 11; however, it is not necessarily limited to this. As shown in FIG. 9, it may also be suitable for a configuration in which the intermediate tap of the secondary winding of the transformer 11 is connected on the positive side at the output terminals Po, and cathode terminals of the diodes 12 and 13 are individually connected to both ends on the secondary winding of the transformer 11.

In addition, by mounting a temperature sensor on the periphery of the electric power converters each shown in FIG. 1 and FIG. 9 and inputting a temperature detected by the temperature sensor into the control unit 17, and by arranging the control unit 17 to control a switching frequency of the isolated converter circuit 16 in accordance with a detected value of the temperature sensor, it is possible to suppress a root-mean-square value of resonance current, and to operate the isolated converter circuit 16 under the conditions to achieve the best efficiency even when a resonance frequency changes due to change in temperature condition and the like.

According to the electric power converter of Embodiment 1 explained above, the arrangement is made to configure the non-isolated buck-boost converter circuit 15 and the isolated converter circuit 16, and so a wide input-output electric power range can be dealt with.

In addition, by allowing the control unit 17 to perform the control of a buck-boost voltage ratio between an input voltage Vi being inputted, and the output voltage Vo of the isolated converter circuit 16 only by the non-isolated buck-boost converter circuit 15, and by allowing the non-isolated buck-boost converter circuit 15 to perform an output voltage control of the isolated converter circuit 16, the isolated converter circuit 16 can perform the switching in a fixed switching pattern, so that it is possible to operate under the conditions to achieve the best efficiency.

In addition, by configuring the non-isolated buck-boost converter circuit 15 as an H-bridge type buck-boost chopper constituted of the smoothing reactor 3, the smoothing capacitor 6, the two diodes 2 and 5, the first semiconductor switching device 1 for controlling an application time of an input voltage Vi into the smoothing reactor 3, and the second semiconductor switching device 4 for controlling an application time of a DC voltage to be outputted from the non-isolated buck-boost converter circuit 15 so that the DC voltage stored in the smoothing capacitor 6 is controlled, it becomes possible to use semiconductor switching devices of the same withstand voltages as those in Japanese Laid-Open Patent Publication No. 2013-258860, and to deal a wider input-output voltage range with low costs.

In addition, an output voltage control is performed in such a manner that, at a time of a boost operation, the second semiconductor switching device 4 performs a turn-on and turn-off control in a state in which the first semiconductor switching device 1 is turned on, and that, at a time of a buck operation, the first semiconductor switching device 1 performs a turn-on and turn-off control in a state in which the second semiconductor switching device 4 is turned off; according to the manner, it becomes possible to use semiconductor switching devices of the same withstand voltages as those in Japanese Laid-Open Patent Publication No. 2013-258860, so that a wide input-output voltage range can be dealt with low costs.

In addition, when input and output voltages of the non-isolated buck-boost converter circuit 15 are approximately equal to each other, increased efficiency can be achieved by turning on the first semiconductor switching device 1 at all times and by turning off the second semiconductor switching device 4 at all times, so that the inputs and outputs are directly cascaded.

Moreover, in a case in which the isolated converter circuit 16 is not going to output electric power, electric power therefrom can be completely halted by turning off the first semiconductor switching device 1 of the non-isolated buck-boost converter circuit 15.

In addition, the isolated converter circuit 16 uses an LLC converter being a resonance type converter which includes the transformer 11 having the primary winding and the secondary winding; the third semiconductor switching device 7, the fourth semiconductor switching device 8, the resonance capacitor 9 and the resonance reactor 10 connected to the primary winding; and the diodes 12 and 13 of rectifier circuit, and the smoothing capacitor 14 connected to the secondary winding. By operating the isolated converter circuit 16 in a fixed switching pattern, a root-mean-square value of resonance current is suppressed, and also the operation is performed on the ZVS, so that it is possible to achieve increased efficiency.

In addition, by applying diode rectification to the rectifier circuit of the isolated converter circuit 16, a gate driver circuit or the like required for a case in which semiconductor switching devices are made up therefor becomes unnecessary, so that it is possible to achieve cost reduction.

In the LLC converter for the isolated converter circuit 16 also, the number of components can be reduced by one by configuring the resonance reactor 10 that is made of a leakage inductance Lr of the transformer 11, so that it is possible to achieve more compact size, lower costs and increased efficiency.

Furthermore, by arranging the control unit 17 to monitor an electric current sensor (output-current detection circuit 24) and to have a means for finely adjusting a switching frequency of the isolated converter circuit 16, it is possible to suppress a root-mean-square value of resonance current, and to operate the isolated converter circuit 16 under the conditions to achieve the best efficiency even when a resonance frequency changes due to component variation, age degradation, change in temperature condition and the like.

Yet furthermore, by arranging the control unit 17 to monitor temperature information and to have a means for finely adjusting a switching frequency of the isolated converter circuit 16, it is possible to suppress a root-meansquare value of resonance current, and to operate the isolated converter circuit 16 under the conditions to achieve the best efficiency even when a resonance frequency changes due to change in temperature condition and the like.

Embodiment 2

Figure 10:
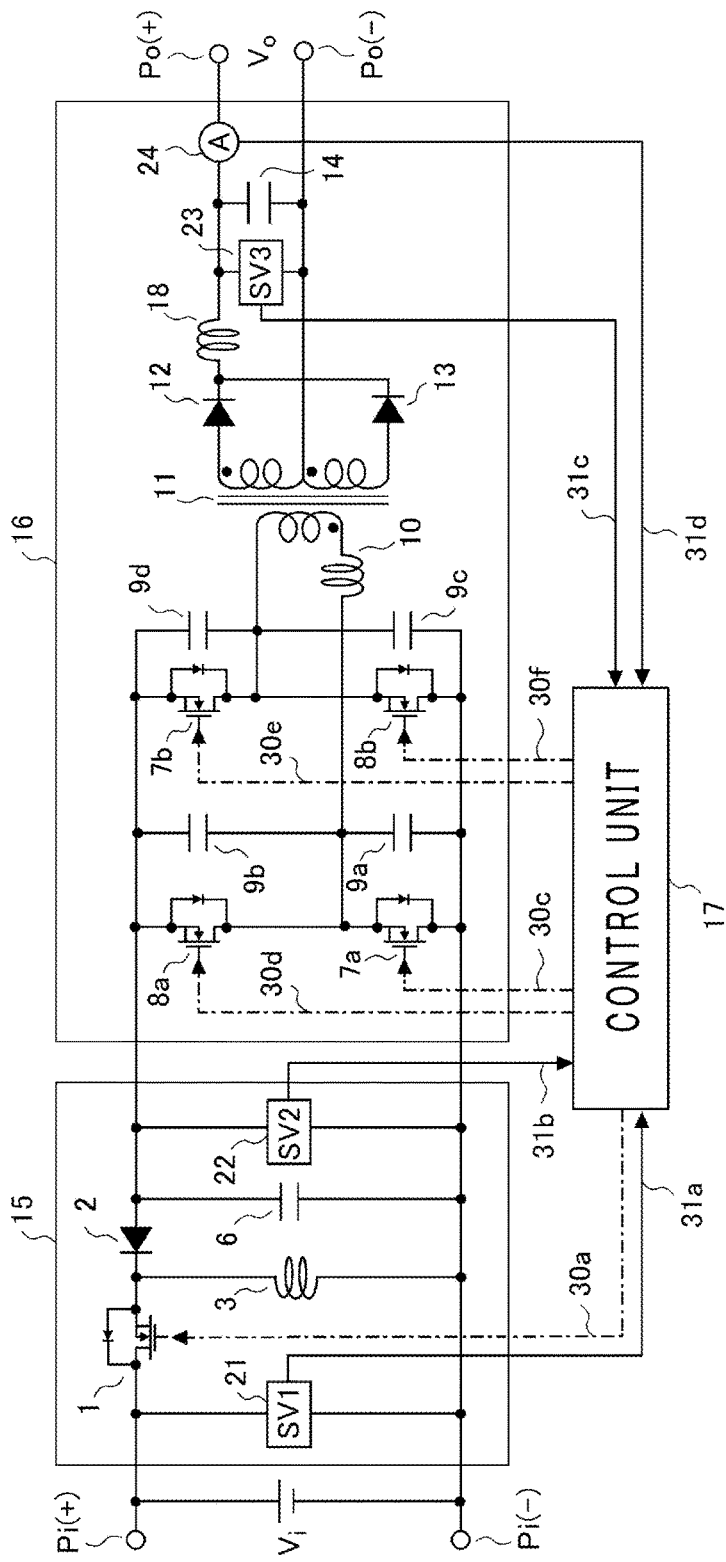
FIG. 10 is a schematic configuration diagram of an electric power converter according to Embodiment 2 of the present invention.

Next, the explanation will be made referring to FIG. 10 through FIG. 15 for an electric power converter according to Embodiment 2 of the present invention. FIG. 10 is a schematic configuration diagram illustrating the electric power converter according to Embodiment 2; in FIG. 10, the electric power converter is a converter configured in a succession of two stages in which a polarity reversal type buck-boost converter circuit is provided as the non-isolated buck-boost converter circuit 15 upstream of the isolated converter circuit 16 that is a voltage resonance type converter.

It is so arranged that an input voltage Vi from input terminals Pi is stepped up or stepped down so as to be converted into an arbitrary DC voltage by means of the non-isolated buck-boost converter circuit 15 made of the polarity reversal type buck-boost converter circuit; then, this DC voltage is inputted into the isolated converter circuit 16, and is thereby outputted at output terminals Po as a DC voltage Vo, which is supplied to a load not shown in the figure.

In the non-isolated buck-boost converter circuit 15, because the polarities are reversed on a voltage Vc of the smoothing capacitor 6 with respect to the input voltage Vi, what is connected on a negative electrode side at the input terminals Pi appears as a positive electrode side of the smoothing capacitor 6.

The non-isolated buck-boost converter circuit 15 is constituted of the first semiconductor switching device 1, the diode 2, the smoothing reactor 3 and the smoothing capacitor 6; as for the first semiconductor switching device 1, its drain terminal is connected on a positive electrode side at the input terminals Pi, and the source terminal is connected to a connection point between the smoothing reactor 3 and the diode 2. As for the diode 2, its anode terminal is connected on a negative electrode side of the smoothing capacitor 6, and the cathode terminal is connected to a connection point between the first semiconductor switching device 1 and the smoothing reactor 3.

The control unit 17 performs the turn-on and turn-off control on the first semiconductor switching device 1 in order to control energization of the smoothing reactor 3, and adjusts a voltage across the smoothing capacitor 6 to an arbitrary value. According to the manner described above, a non-isolated buck-boost converter circuit can be configured by the same number of devices with those in a non-isolated converter of Japanese Laid-Open Patent Publication No. 2013-258860.

The isolated converter circuit 16 is connected downstream of the non-isolated buck-boost converter circuit 15; the isolated converter circuit includes third through sixth semiconductor switching devices 7a, 8a, 7b and 8b, resonance capacitors 9a, 9b, 9c and 9d and the resonance reactor 10 made of a leakage inductance of the transformer 11 on the primary side of the transformer 11, and includes the diodes 12 and 13 which form a rectifier circuit, the smoothing capacitor 14 connected in parallel with the output terminals Po and a smoothing reactor 18 connected in series to one end of the output terminals Po on the secondary side of the transformer 11.

A drain terminal of the third semiconductor switching device 7a is connected on a positive electrode side of the smoothing capacitor 6; and a source terminal of the fourth semiconductor switching device 8a is connected on the negative electrode side of the smoothing capacitor 6. A source terminal of the third semiconductor switching device 7a and a drain terminal of the fourth semiconductor switching device 8a are mutually connected. Similarly, a drain terminal of the sixth semiconductor switching device 8b is connected on the positive electrode side of the smoothing capacitor 6; and a source terminal of the fifth semiconductor switching device 7b is connected on the negative electrode side of the smoothing capacitor 6. A source terminal of the sixth semiconductor switching device 8b and a drain terminal of the fifth semiconductor switching device 7b are mutually connected.

In addition, the third semiconductor switching device 7a is connected in parallel with the resonance capacitor 9a; the fourth semiconductor switching device 8a, in parallel with the resonance capacitor 9b; the sixth semiconductor switching device 8b, in parallel with the resonance capacitor 9c; and the fifth semiconductor switching device 7b, in parallel with the resonance capacitor 9d. The resonance reactor 10 and the transformer 11 are connected in series to each other so as to be interposed at a connection point between the source terminal of the third semiconductor switching device 7a and the drain terminal of the fourth semiconductor switching device 8a, and at a connection point between the drain terminal of the fifth semiconductor switching device 7b and the source terminal of the sixth semiconductor switching device 8b.

In FIG. 10, the connection is made in order of, from a connection point between the source terminal of the third semiconductor switching device 7a and the drain terminal of the fourth semiconductor switching device 8a, the resonance reactor 10 being a leakage inductance of the transformer 11 and the transformer 11; however, it is not necessarily limited to this. It may be adopted that the connection is made in the order from a connection point between the drain terminal of the fifth semiconductor switching device 7b and the source terminal of the sixth semiconductor switching device 8b.

On the secondary winding side of the transformer 11, a rectifier circuit formed by the diode 12 and the diode 13 is included; the secondary winding of the transformer 11 has an intermediate tap, and the intermediate tap is connected on the negative side at the output terminals Po. At both ends on the secondary side of the transformer 11, respective anode terminals of the diodes 12 and 13 are connected; the cathode terminal of the diode 12 and the cathode terminal of the diode 13 are connected to each other; and, to the connection point, the smoothing reactor 18 is connected. In addition, the other end of the smoothing reactor 18 is connected on the positive side at the output terminals Po.

In order to acquire a voltage value of input voltage Vi, the input-voltage detection circuit 21 is connected in parallel with the input terminals Pi; in order to acquire a value of output voltage of the non-isolated buck-boost converter circuit 15, the smoothing-capacitor-voltage detection circuit 22 is connected in parallel with the smoothing capacitor 6; and, in order to acquire a voltage value at the output terminals Po, the output-voltage detection circuit 23 is provided in parallel with the output terminals Po. It is also arranged that the output-current detection circuit 24 is connected on the positive electrode side at the output terminals Po, and an output current is detected.

The control unit 17 performs the turn-on and turn-off control on the respective first and third through sixth semiconductor switching devices 1, 7a, 8a, 7b and 8b by way of control lines 30a, 30c, 30d, 30e and 30f. In addition, the control unit 17 acquires detected values of voltage from the input-voltage detection circuit 21, the smoothing-capacitor-voltage detection circuit 22 and the output-voltage detection circuit 23 by way of the signal lines 31a, 31b and 31c, respectively, and acquires a value of output current from the output-current detection circuit 24 by way of the signal line 31d.

Here, the explanation will be made for operation principles of the non-isolated buck-boost converter circuit 15 of the electric power converter according to Embodiment 2.

Figure 11:
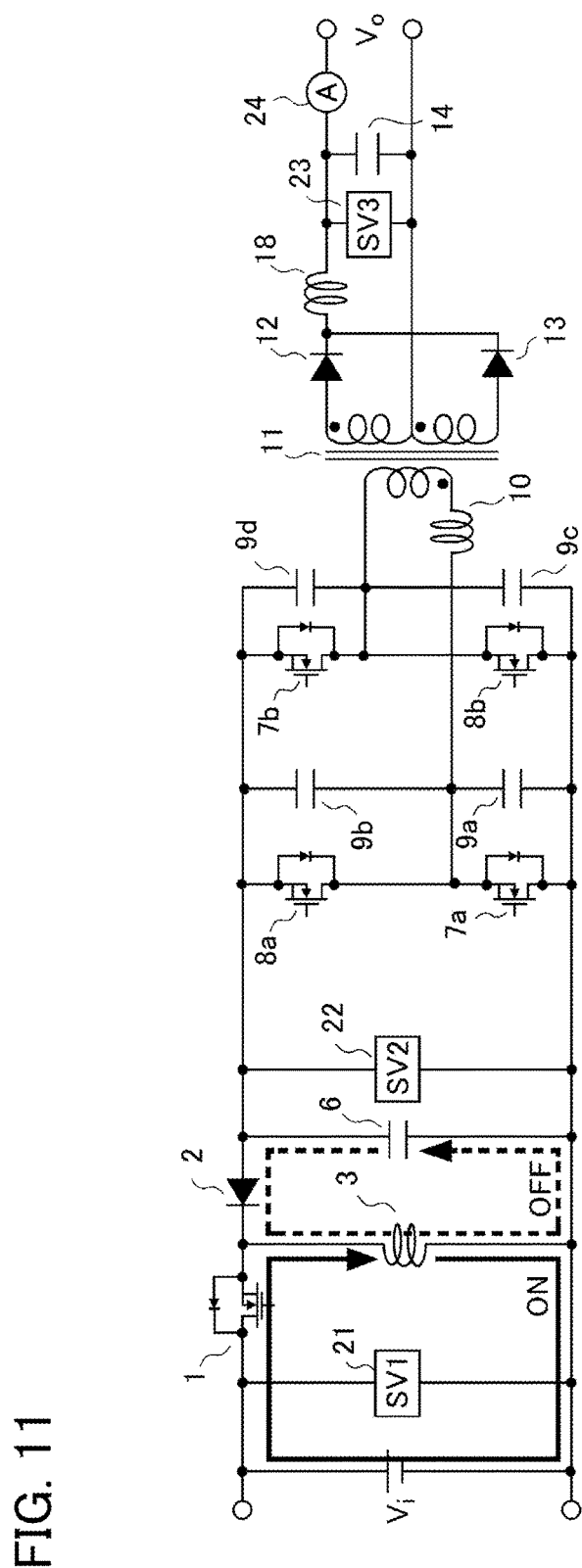
FIG. 11 is an illustrative diagram for explaining an electric current path when a control unit turns on or off a first semiconductor switching device in the electric power converter according to Embodiment 2 of the present invention.

By performing the turn-on and turn-off control on the first semiconductor switching device 1, electric current paths shown in FIG. 11 are passed through. In FIG. 11, the arrow of solid line indicates an electric current flow when the first semiconductor switching device 1 is turned on; and the arrow of broken line, an electric current flow when the first semiconductor switching device 1 is turned off. The control unit 17 controls an output voltage of the non-isolated buck-boost converter circuit 15, and adjusts the output voltage Vo of the isolated converter circuit 16 so that it approaches its target value.

Next, the explanation will be made for the operations of the isolated converter circuit 16. The control unit 17 performs the turn-on and turn-off control on the respective third through sixth semiconductor switching devices 7a, 8a, 7b and 8b. The third semiconductor switching device 7a and the fourth semiconductor switching device 8a are alternately turned on at a duty ratio of approximately 50% interposing a dead time td. Similarly, the fifth semiconductor switching device 7b and the sixth semiconductor switching device 8b are alternately turned on at a duty ratio of approximately 50% interposing a dead time td.

The explanation will be made in more detail referring to FIG. 12, FIG. 13A, FIG. 13B, FIG. 13C and FIG. 13D for basic operations of the isolated converter circuit 16. Here, as phase shift control, the fifth and sixth semiconductor switching devices 7b and 8b start to turn-on or turn-off in advance of (each phase, leading) the third and fourth semiconductor switching devices 7a and 8a, respectively (refer to FIG. 12).

Figure 12:
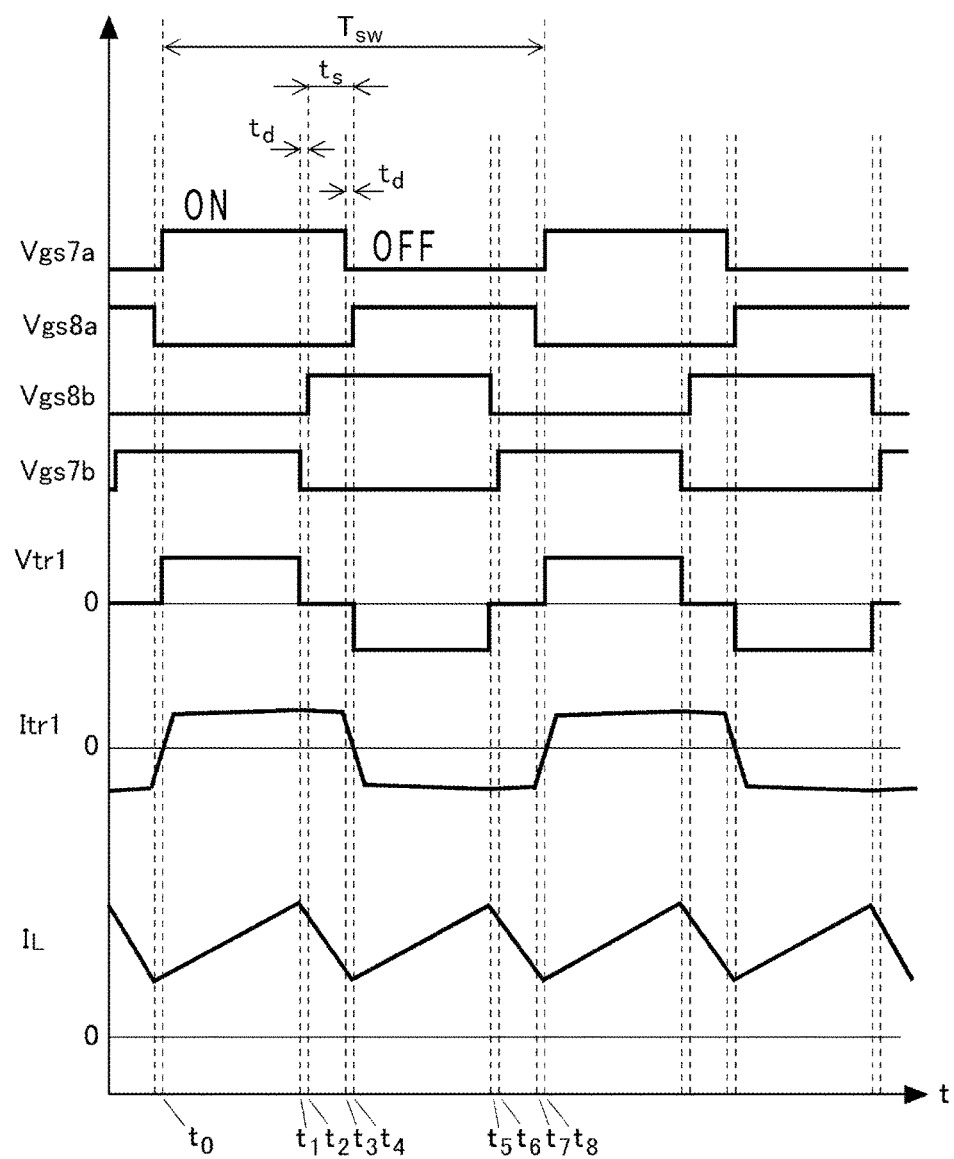
FIG. 12 is an illustrative diagram for explaining each of voltage and current waveforms in operation of an isolated converter circuit in the electric power converter according to Embodiment 2 of the present invention.

FIG. 12 is a diagram showing each of voltage and current waveforms in operation of the isolated converter circuit 16 of the electric power converter according to Embodiment 2.

In FIG. 12, the horizontal axis indicates an axis of time. The times t0 and t3 are timings at which the third semiconductor switching device 7a turns on and off, respectively. The times t4 and t7 are timings at which the fourth semiconductor switching device 8a turns on and off, respectively. The times t2 and t5 are timings at which the sixth semiconductor switching device 8b turns on and off, respectively. The times t1 and t6 are timings at which the fifth semiconductor switching device 7b turns off and on, respectively. In addition, between the timings at which the respective third and fourth semiconductor switching devices 7a and 8a turn on/off, a dead time td is interposed. Similarly, between the timings at which the respective fifth and sixth semiconductor switching devices 7b and 8b turn on/off, a dead time td is interposed.

In addition, FIG. 12 shows each of the voltage and current waveforms for a gate voltage Vgs7a applied between the gate and source of the third semiconductor switching device 7a, a gate voltage Vgs8a applied between the gate and source of the fourth semiconductor switching device 8a, a gate voltage Vgs7b applied between the gate and source of the fifth semiconductor switching device 7b, a gate voltage Vgs8b applied between the gate and source of the sixth semiconductor switching device 8b, a voltage Vtr1 applied on the primary side of the transformer 11, an electric current Itr1 flowing through the primary side of the transformer 11, and an electric current IL flowing through the smoothing reactor 18.

FIG. 13A, FIG. 13B, FIG. 13C, FIG. 13D, FIG. 14A, FIG. 14B, FIG. 14C and FIG. 14D each show a path(s) of electric current at times when the third through sixth semiconductor switching devices 7a, 8a, 7b and 8b of the isolated converter circuit 16 are turned on and/or off.

Figure 13A:
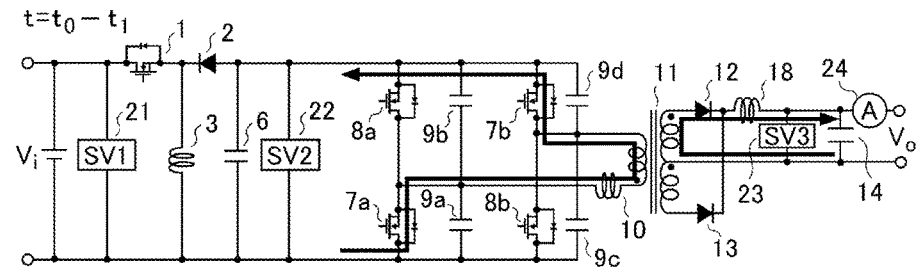
FIG. 13A, FIG. 13B, FIG. 13C and FIG. 13D are illustrative diagrams each for explaining electric current paths when semiconductor switching devices of the isolated converter circuit are turned on and/or off in the electric power converter according to Embodiment 2 of the present invention.

When the third semiconductor switching device 7a is turned on at a time t=t0, an electric current flowing through the primary winding side of the transformer 11 flows through the path: the smoothing capacitor 6→the third semiconductor switching device 7a→the resonance reactor 10 the transformer 11→and the fifth semiconductor switching device 7b as shown in FIG. 13(a). An electric current flowing through the secondary winding side of the transformer 11 flows through the path: the transformer 11→the diode 12→the smoothing reactor 18→and the smoothing capacitor 14.

Figure 13B:
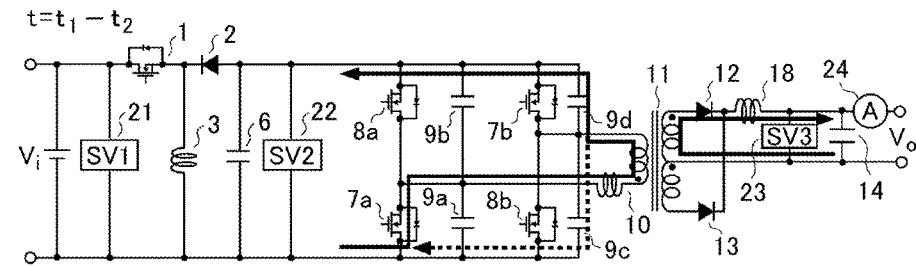

When the fifth semiconductor switching device 7b is turned off at a time t=t1, the resonance capacitor 9d is charged, and the resonance capacitor 9c is discharged. An electric current flowing through the primary winding side of the transformer 11 flows through the path: the smoothing capacitor 6→the third semiconductor switching device 7a→the resonance reactor 10→the transformer 11→and the resonance capacitor 9d as shown in FIG. 13B, so that the resonance capacitor 9d is charged. In addition, an electric current flows through the path: the third semiconductor switching device 7a→the resonance reactor 10→the transformer 11→and the resonance capacitor 9c, so that the resonance capacitor 9c is discharged. An electric current flowing through the secondary winding side of the transformer 11 flows through the path: the transformer 11→the diode 12→the smoothing reactor 18→and the smoothing capacitor 14. Note that, when the discharge of the resonance capacitor 9c is completed, the body diode of the sixth semiconductor switching device 8b starts conducting, so that an electric current flows through the path: the third semiconductor switching device 7a→the resonance reactor 10→the transformer 11→and the sixth semiconductor switching device 8b.

Figure 13C:
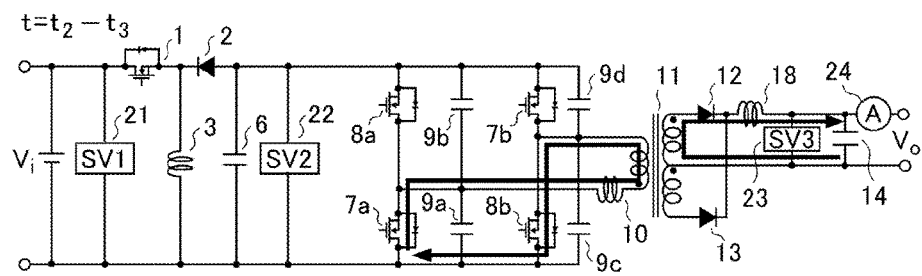

When the sixth semiconductor switching device 8b turns on at a time t=t2, an electric current flowing through the primary winding side of the transformer 11 flows through the path: the third semiconductor switching device 7a→the resonance reactor 10→the transformer 11→and the sixth semiconductor switching device 8b as shown in FIG. 13C. An electric current flowing through the secondary winding side of the transformer 11 flows through the path: the transformer 11→the diode 12→the smoothing reactor 18→and the smoothing capacitor 14. Because an electric current flows through the body diode of the sixth semiconductor switching device 8b until immediately before the time, a voltage applied across both ends of the sixth semiconductor switching device 8b is 0 V, so that switching losses are not caused (ZVS).

Figure 13D:
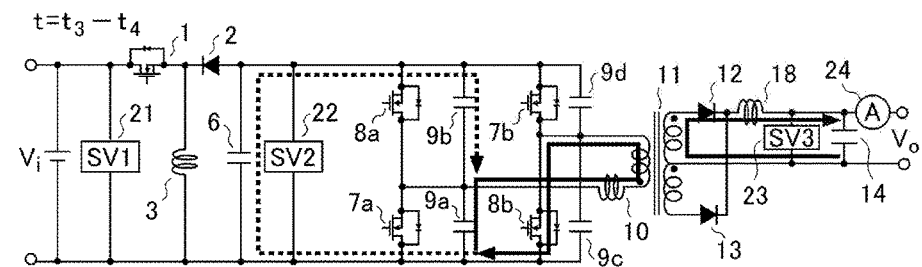

The third semiconductor switching device 7a turns off at a time t=t3, so that the resonance capacitor 9a is charged, and the resonance capacitor 9b is discharged. An electric current flowing through the primary winding side of the transformer 11 flows through the path: the resonance capacitor 9a→the resonance reactor 10→the transformer 11→and the sixth semiconductor switching device 8b as shown in FIG. 13D, so that the resonance capacitor 9a is charged. In addition, an electric current flows through the path: the smoothing capacitor 6→the resonance capacitor 9b→the resonance reactor 10→the transformer 11→and the sixth semiconductor switching device 8b, so that the resonance capacitor 9b is discharged. An electric current flowing through the secondary winding side of the transformer 11 flows through the path: the transformer 11→the diode 12→the smoothing reactor 18→and the smoothing capacitor 14. Note that, when the discharge of the resonance capacitor 9b is completed, the body diode of the fourth semiconductor switching device 8a starts conducting, so that an electric current flows through the path: the fourth semiconductor switching device 8a→the resonance reactor 10→the transformer 11→and the sixth semiconductor switching device 8b.

Figure 14A:
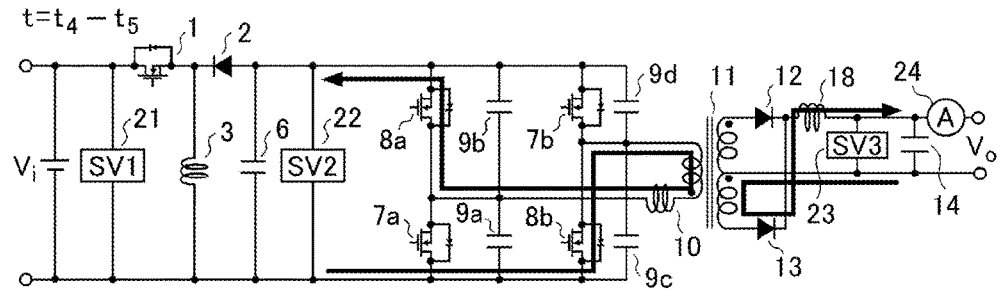
FIG. 14A, FIG. 14B, FIG. 14C and FIG. 14D are illustrative diagrams each for explaining electric current paths when the semiconductor switching devices of the isolated converter circuit are turned on and/or off in the electric power converter according to Embodiment 2 of the present invention.

When the sixth semiconductor switching device 8b turns on at a time t=t4, an electric current flowing through the primary winding side of the transformer 11 flows through the path: the smoothing capacitor 6→the sixth semiconductor switching device 8b→the transformer 11→the resonance reactor 10→and the fourth semiconductor switching device 8a as shown in FIG. 14A. An electric current flowing through the secondary winding side of the transformer 11 flows through the path: the transformer 11→the diode 13→the smoothing reactor 18→and the smoothing capacitor 14. Because an electric current flows through the body diode of the fourth semiconductor switching device 8a until immediately before the time, a voltage applied across both ends of the fourth semiconductor switching device 8a is 0 V, so that switching losses are not caused (ZVS).

Figure 14B:
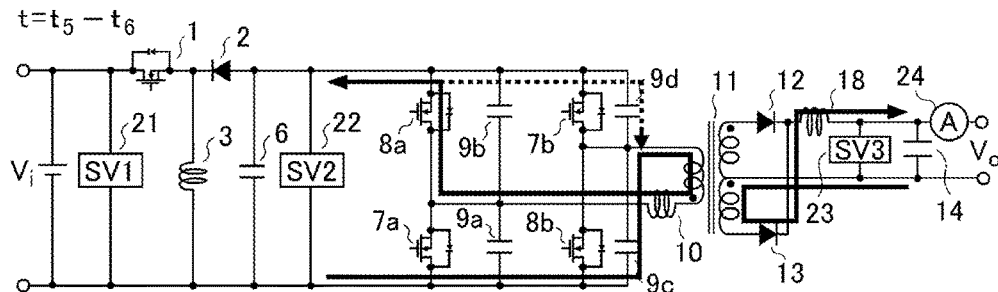

The sixth semiconductor switching device 8b turns off at a time t=t5, so that the resonance capacitor 9c is charged, and the resonance capacitor 9d is discharged. An electric current flowing through the primary winding side of the transformer 11 flows through the path: the smoothing capacitor 6→the resonance capacitor 9c→the transformer 11→the resonance reactor 10→and the fourth semiconductor switching device 8a as shown in FIG. 14B, so that the resonance capacitor 9c is charged. In addition, an electric current flows through the path: the resonance capacitor 9d→the transformer 11→the resonance reactor 10→and the fourth semiconductor switching device 8a, so that the resonance capacitor 9d is discharged. An electric current flowing through the secondary winding side of the transformer 11 flows through the path: the transformer 11→the diode 13→the smoothing reactor 18→and the smoothing capacitor 14. Note that, when the discharge of the resonance capacitor 9d is completed, the body diode of the fifth semiconductor switching device 7b starts conducting, so that an electric current flows through the path: the fifth semiconductor switching device 7b→the transformer 11→the resonance reactor 10→and the fourth semiconductor switching device 8a.

Figure 14C:
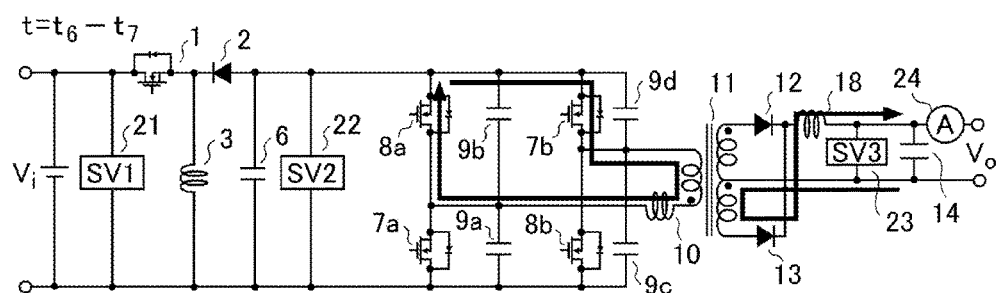

When the fifth semiconductor switching device 7b turns on at a time t=t6, an electric current flowing through the primary winding side of the transformer 11 flows through the path: the fifth semiconductor switching device 7b→the transformer 11→the resonance reactor 10→and the fourth semiconductor switching device 8a as shown in FIG. 14C. An electric current flowing through the secondary winding side of the transformer 11 flows through the path: the transformer 11→the diode 13→the smoothing reactor 18→and the smoothing capacitor 14. Because an electric current flows through the body diode of the fifth semiconductor switching device 7b until immediately before the time, a voltage applied across both ends of the fifth semiconductor switching device 7b is 0 V, so that switching losses are not caused (ZVS).

Figure 14D:
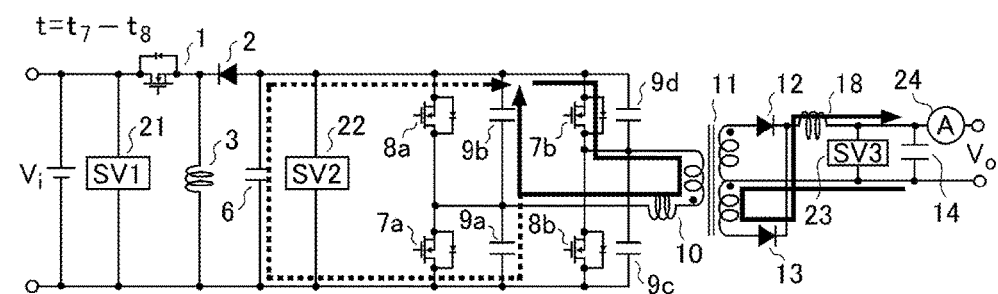

The fourth semiconductor switching device 8a turns off at a time t=t7, so that the resonance capacitor 9b is charged, and the resonance capacitor 9a is discharged. An electric current flowing through the primary winding side of the transformer 11 flows through the path: the fifth semiconductor switching device 7b→the transformer 11→the resonance reactor 10→and the resonance capacitor 9b as shown in FIG. 14D, so that the resonance capacitor 9b is charged. In addition, an electric current flows through the path: the resonance capacitor 9a→the smoothing capacitor 6→the fifth semiconductor switching device 7b→the transformer 11→and the resonance reactor 10, so that the resonance capacitor 9a is discharged. An electric current flowing through the secondary winding side of the transformer 11 flows through the path: the transformer 11→the diode 13→the smoothing reactor 18→and the smoothing capacitor 14. Note that, when the discharge of the resonance capacitor 9a is completed, the body diode of the third semiconductor switching device 7a starts conducting, so that an electric current flows through the path: the smoothing capacitor 6→the fifth semiconductor switching device 7b→the transformer 11→the resonance reactor 10→and the third semiconductor switching device 7a. From after a time t=t8, the paths are the same as those at t=t0, and so the aforementioned manners are repeated.

Here, the explanation will be made for charging and discharging capacitors during dead time periods in FIG. 13B and FIG. 14B, and FIG. 13D and FIG. 14D. In FIG. 13B and FIG. 14B, because electric power transmission has been performed until immediately before then, the transformer 11 is coupled with the secondary side also immediately after the semiconductor switching device turns off. For this reason, the energy to charge and discharge the resonance capacitors 9c and 9d is large, so that the ZVS is easy to be held.

On the other hand, as in FIG. 13D and FIG. 14D, the rectifier diodes 12 and 13 on the secondary side of the transformer 11 are both turned on until immediately before then; and thus, for example in FIG. 13D, the third semiconductor switching device 7a has been turned off, and the resonance capacitors 9a and 9b form a resonance circuit only with the resonance reactor 10. Consequently, the energy to charge and discharge the resonance capacitors 9a and 9b is only due to the resonance reactor 10; for this reason, when the capacitance of the resonance capacitors 9a and 9b is given as C, an inductance component of the resonance reactor 10, as L, and an electric current flowing through the resonance reactor 10, as I, the resonance capacitors 9a and 9b cannot be completely charged and discharged when Equation (7) is not held.

[Equation FIG. 4]

$$\tfrac{1}{2} \cdot L \cdot I^2 \geq \tfrac{1}{2} \cdot C \cdot V^2 \times 2 \qquad (7)$$

In FIG. 13B and FIG. 14B, a leakage inductance component of the transformer 11 is also included in the inductance L of Equation (7) shown above.

For this reason, in order to hold the ZVS in FIG. 13D and FIG. 14D, an inductance value and the quantity of electric current which satisfy Equation (7) are required; and, in general, the ZVS is not held when the inductance value of the resonance reactor 10 is small at the time of light loading.

In Embodiment 2, it is possible to hold Equation (7) by lowering the voltage V of Equation (7) by such a manner that a voltage Vc across the smoothing capacitor 6 is reduced at the time of light loading by means of the non-isolated buck-boost converter circuit 15, so that, in a wider range, it is possible to operate the isolated converter circuit 16 at its operating point in which its efficiency is high.

In addition, the isolated converter circuit 16 of Embodiment 2 transmits electric power in the time-periods t0 to t1 and t4 to t5, and does not transmit electric power in other time-periods. However, even in other time-periods when electric power is not transmitted, electric currents flow through the circuits; values of the electric currents depend on a load current. Consequently, the isolated converter circuit 16 operates in high efficiency by reducing a shift time ts of FIG. 12, and by shortening the time-periods other than those of t0 to t1 and t4 to t5. It should be noted that, when turn ratios of the transformer 11 are given as N:1:1, the relationships among a voltage across the smoothing capacitor, Vc, an output voltage Vo, a switching period Tsw, a shift time ts and a dead time td are expressed by Equation (8).

[Equation Figure-5]

$$Vo = \frac{Tsw}{Tsw - 2(ts + td)} \cdot \frac{Vc}{N} \quad (8)$$

In accordance with Equation (8), in order to reduce the shift time ts, it is suitable that the voltage across the smoothing capacitor, Vc, is reduced. Here, when the shift time ts is set to 0, Equation (8) is given as Equation (9).

[Equation Figure-6]

$$Vo = \frac{Tsw}{Tsw - 2td} \cdot \frac{Vc}{N} \cong \frac{Vc}{N} \quad (9)$$

Consequently, in order to operate the isolated converter circuit 16 in high efficiency, it is suitable that a voltage across the smoothing capacitor, Vc, is reduced by the non-isolated buck-boost converter circuit 15; when the voltage across the smoothing capacitor, Vc, is N-times as high as an output voltage Vo, the best efficiency is achieved.

Accordingly, the isolated converter circuit 16 of Embodiment 2 operates in even higher efficiency by controlling the non-isolated buck-boost converter circuit 15 so that the voltage across the smoothing capacitor, Vc, becomes N-times as high as an output voltage Vo.

The control unit 17 adjusts a voltage of the non-isolated buck-boost converter circuit 15 so that a voltage value of the output-voltage detection circuit 23 acquired by way of the signal line 31c approaches a target value. Here, the explanation will be made by exemplifying for specific control methods.

When a voltage across the smoothing capacitor 6 at an output-circuit portion of the non-isolated buck-boost converter circuit 15 is given as Vc, and the turn ratios of the transformer 11 are given as N:1:1, Equation (10) is held as follows.

[Equation Figure-7]

$$Vo = \frac{1}{N} \times Vc \quad (10)$$

In accordance with Equation (2), when a target value of the output voltage Vo is given as Vo*, a control target-value Vc* for a voltage across the smoothing capacitor 6 at the output-circuit portion of the non-isolated buck-boost converter circuit 15 can be given as Equation (11).

$$Vc^* = N \times Vo^* \quad (11)$$

The non-isolated buck-boost converter circuit 15 is a circuit which converts an input voltage Vi into a voltage Vc across the smoothing capacitor 6. At a time of a buck operation, Equation (12) is held when an ON-duty $D_1$ of the first semiconductor switching device 1 is used.

[Equation Figure-8]

$$Vc = \frac{D_1}{1 - D_1} \cdot Vi \quad (12)$$

Accordingly, the control is performed to achieve that a control target-value for the non-isolated buck-boost converter circuit 15 obtained by Equation (11) approaches a Vc*.

According to the above, the control unit 17 controls a duty ratio of the first semiconductor switching device 1 so that an output voltage Vo follows after its target value, and adjusts an output voltage of the non-isolated buck-boost converter circuit 15 (≅a voltage across the smoothing capacitor 6).

The aforementioned manner is the control method of an output voltage of the non-isolated buck-boost converter circuit 15. Under actual circumstances, there is a case in which, due to a voltage drop of each of circuit devices of the isolated converter circuit 16, a sensor error of each of the voltage detection circuits and the like, the output voltage Vo of the isolated converter circuit 16 is lower (or higher) than a target value Vo*, even when an output voltage of the non-isolated buck-boost converter circuit 15 is controlled. At this time, when a target value of an output voltage Vo is given as Vo* and a voltage value acquired by the output-voltage detection circuit 23, as Vo_mon, the control is performed in such a manner that, with respect to the difference ΔVo toward a target value of the output voltage Vo determined by Equation (5), the output voltage Vo of the isolated converter circuit 16 finally becomes the target value Vo* by adding, to a control target-value Vc* of the non-isolated buck-boost converter circuit 15, a value to which a proportional gain and an integral gain are added.

Hereinbefore, the explanation has been made for an example in which an output voltage Vc of the non-isolated buck-boost converter circuit 15 is controlled; however, it is not necessarily limited to this. It may be adopted that, for example, the control unit 17 controls an output voltage of the non-isolated buck-boost converter circuit 15 so that an output voltage Vo of the isolated converter circuit 16 approaches its target value Vo*.

When it is not required to transmit electric power to a load in such a case that an output voltage Vo is significantly higher than a target value Vo*, or the like, the control unit 17 continuously turns off the first semiconductor switching device 1. According to this arrangement, superfluous electric power is eliminated to be transmitted to the load, so that it is prevented to cause that an output voltage Vo undergoes overvoltages.

Figure 15:
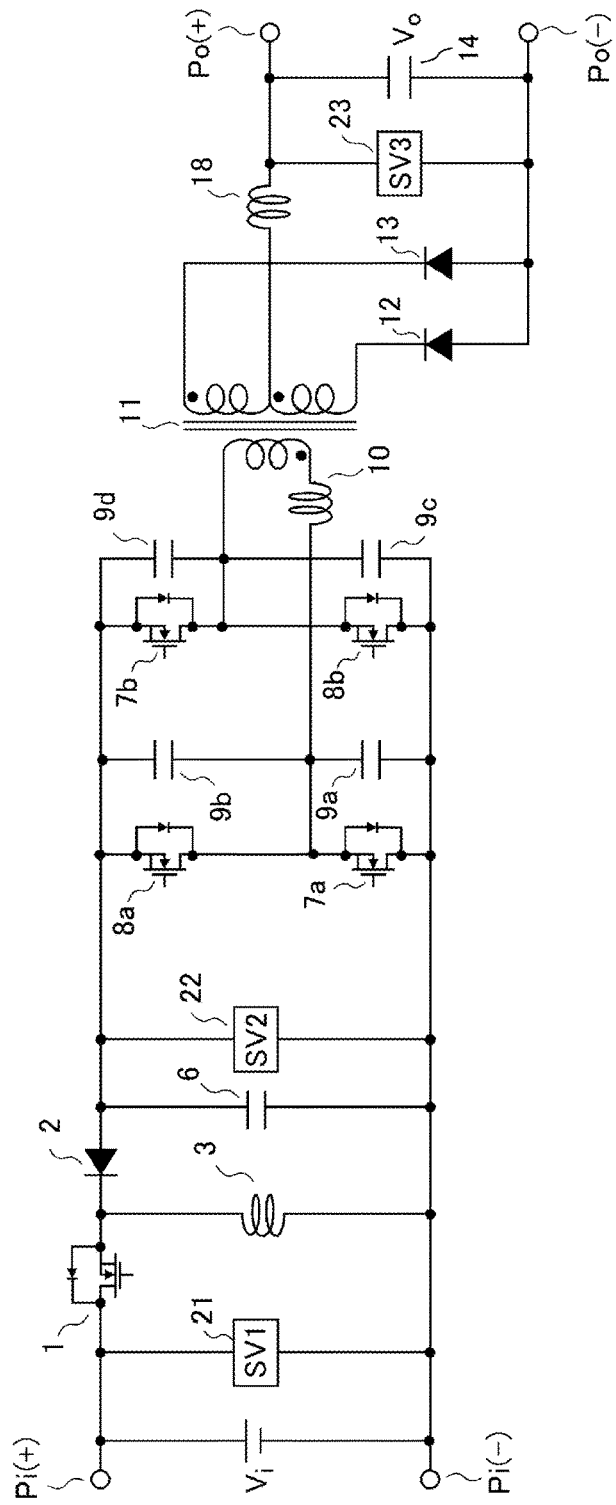
FIG. 15 is a configuration diagram of a modification example of the electric power converter according to Embodiment 2 of the present invention.

In Embodiment 2, the intermediate tap of the secondary winding of the transformer 11 is connected on the negative side at the output terminals Po, and anode terminals of the diodes 12 and 13 are individually connected to both ends on the secondary winding of the transformer 11; however, it is not necessarily limited to this. As shown in FIG. 15, it may also be suitable for a configuration in which the intermediate tap of the secondary winding of the transformer 11 is connected on the positive side at the output terminals Po, and cathode terminals of the diodes 12 and 13 are individually connected to both ends on the secondary winding of the transformer 11.

According to the electric power converter of Embodiment 2 explained above, the arrangement is made to configure the non-isolated buck-boost converter circuit 15 and the isolated converter circuit 16, and so a wide input-output electric power range can be dealt with.

In addition, by performing the output voltage control of the isolated converter circuit 16 by means of the non-isolated buck-boost converter circuit 15, the isolated converter circuit 16 can perform the switching in a fixed switching pattern, so that it is possible to operate under the conditions to achieve the best efficiency.

In addition, by configuring the non-isolated buck-boost converter circuit 15 by a polarity reversal type buck-boost chopper having the diode 2, the smoothing reactor 3, the smoothing capacitor 6 and the first semiconductor switching device 1 for controlling energization of the smoothing reactor 3, the non-isolated buck-boost converter circuit can be configured by the same number of components with those in Japanese Laid-Open Patent Publication No. 2013-258860, so that a wide input-output voltage range can be dealt with low costs.

Moreover, in a case in which the isolated converter circuit 16 is not going to output electric power, electric power therefrom can be completely halted by turning off the first semiconductor switching device 1 of the non-isolated buck-boost converter circuit 15.

In addition, by using a resonance converter of voltage resonance for the isolated converter circuit 16, the third through sixth semiconductor switching devices 7a, 8a, 7b and 8b operate on the ZVS, so that it is possible to achieve increased efficiency.

Furthermore, by applying diode rectification to the rectifier circuit of the isolated converter circuit 16, a gate driver circuit or the like required for a case in which semiconductor switching devices are made up therefor becomes unnecessary, so that it is possible to achieve cost reduction.

In the resonance converter for the isolated converter circuit 16 also, the number of components can be reduced by one by configuring the resonance reactor 10 that is made of a leakage reactor of the transformer 11, so that it is possible to achieve more compact size, lower costs and increased efficiency.

Embodiment 3

Figure 16:
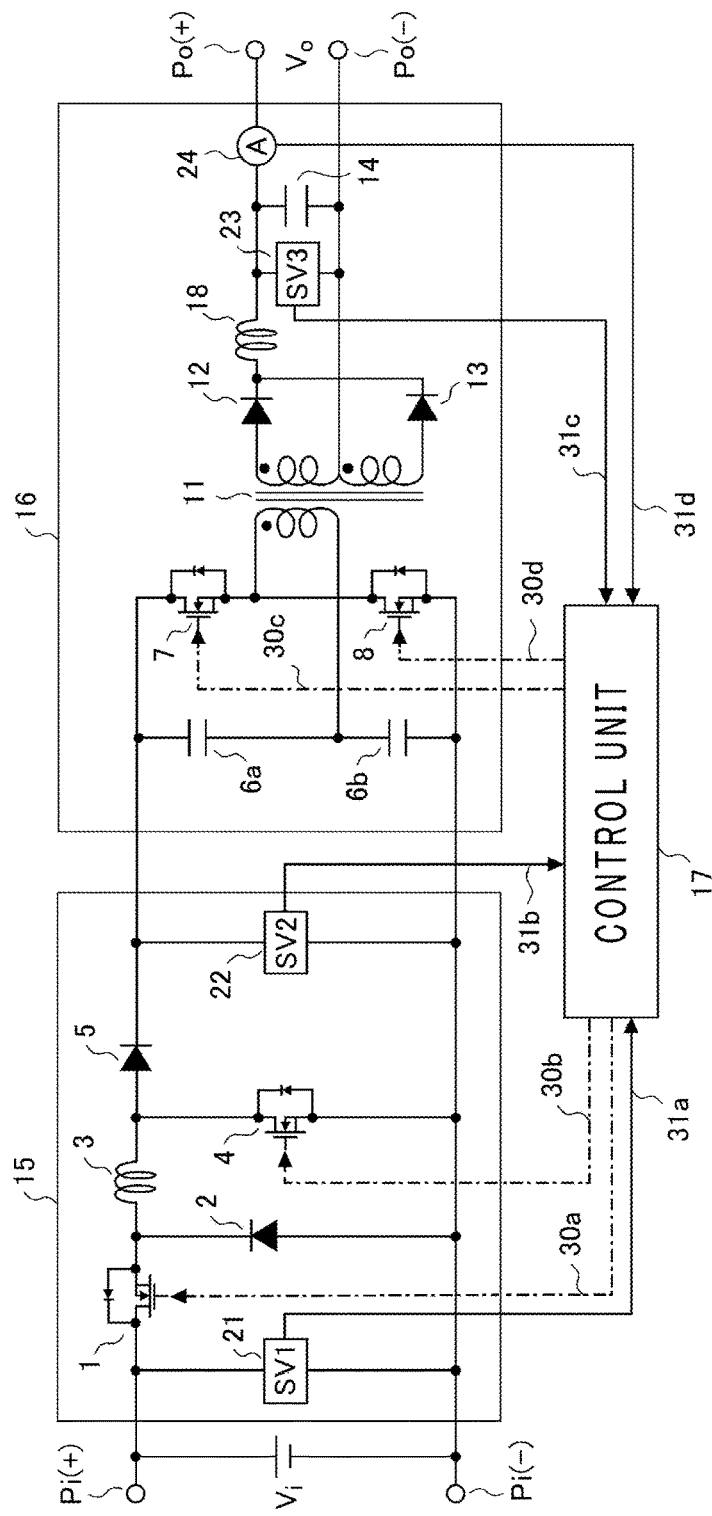
FIG. 16 is a schematic configuration diagram of an electric power converter according to Embodiment 3 of the present invention.

Next, the explanation will be made referring to FIG. 16 for an electric power converter according to Embodiment 3 of the present invention. FIG. 16 is a schematic configuration diagram of the electric power converter according to Embodiment 3 of the present invention.

As illustrated in FIG. 16, the electric power converter is a converter configured in a succession of two stages in which the non-isolated buck-boost converter circuit 15 is placed upstream of the isolated converter circuit 16 being a half-bridge type converter. The non-isolated buck-boost converter circuit 15 is the same H-bridge type as that in Embodiment 1; however, the isolated converter circuit 16 is arranged to be of a half-bridge type in place of the full-bridge type of Embodiment 2.

An input voltage Vi from input terminals Pi is converted into an arbitrary DC voltage by means of the non-isolated buck-boost converter circuit 15, and an output voltage Vo is outputted by means of the isolated converter circuit 16.

The isolated converter circuit 16 is connected downstream of the non-isolated buck-boost converter circuit 15, and is an isolated converter circuit of a half-bridge type that includes, on the primary side of the transformer 11, the third and fourth semiconductor switching devices 7 and 8, and smoothing (divided) capacitors 6a and 6b, and that includes, on the secondary side of the transformer 11, the diodes 12 and 13 which form a rectifier circuit, the smoothing reactor 18 and the smoothing capacitor 14.

In general, because an isolated converter circuit of a half-bridge type also achieves the best efficiency when the third and fourth semiconductor switching devices 7 and 8 are complementarily turning on and off at fixed frequency and duty ratio of 50% in a similar manner to the isolated converter circuit 16 of Embodiment 2, the control of a buck-boost voltage ratio is not performed in the isolated converter circuit 16, but the control of a buck-boost voltage ratio is performed by means of the non-isolated buck-boost converter circuit 15. According to the manner described above, it is possible to operate the isolated converter circuit 16, without depending on its input and output conditions, under the conditions to achieve its best efficiency.

According to the electric power converter of Embodiment 3 explained above, the isolated converter circuit 16 is made of a half-bridge converter, so that the isolated converter circuit 16 can be configured by a small number of components and circuits with simple connections, and it becomes possible to achieve cost reduction and more compact size.

Embodiment 4

Figure 17:
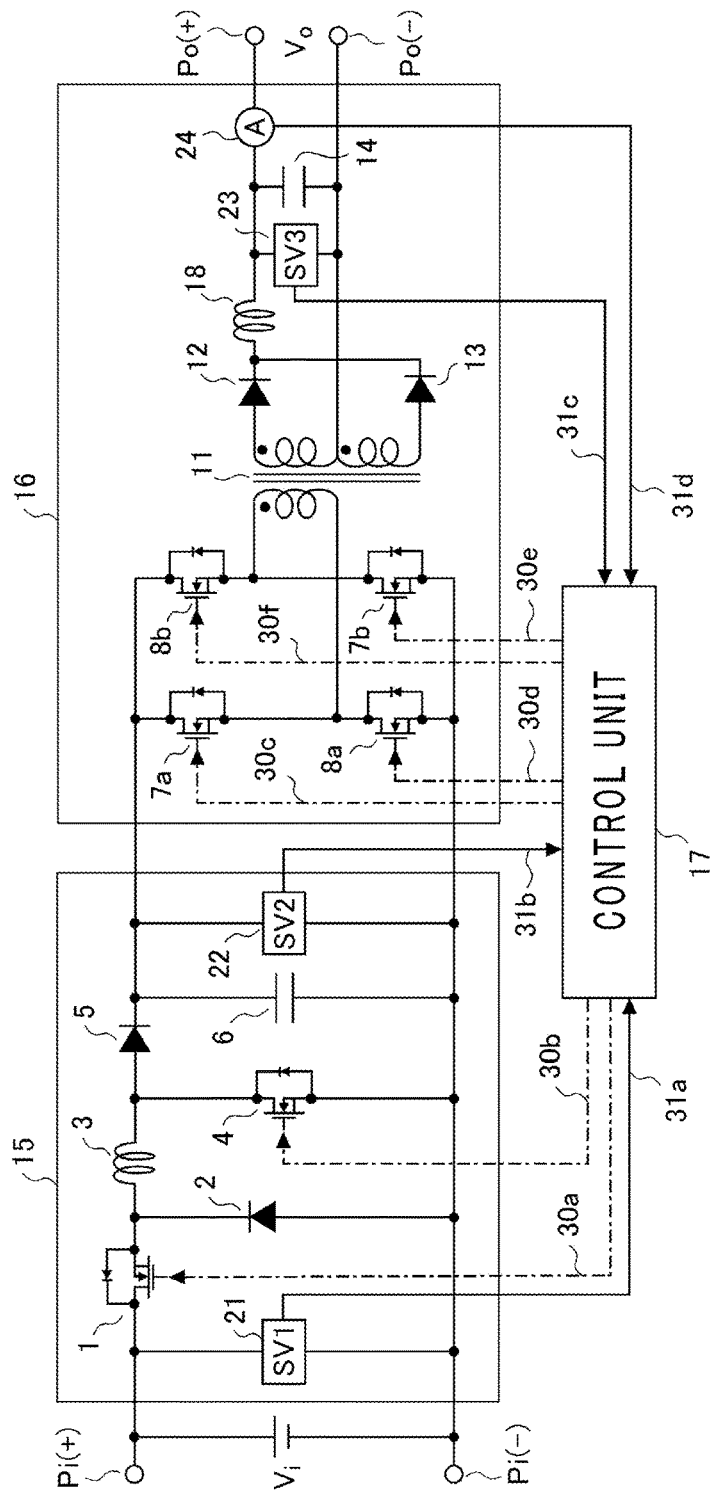
FIG. 17 is a schematic configuration diagram of an electric power converter according to Embodiment 4 of the present invention.

Next, the explanation will be made referring to FIG. 17 for an electric power converter according to Embodiment 4 of the present invention. FIG. 17 is a schematic configuration diagram of the electric power converter according to Embodiment 4 of the present invention.

As illustrated in FIG. 17, the electric power converter is a converter configured in a succession of two stages in which the non-isolated buck-boost converter circuit 15 is placed upstream of the isolated converter circuit 16 being a voltage resonance type converter. The non-isolated buck-boost converter circuit 15 is the same H-bridge type as that in Embodiment 1; however, the isolated converter circuit 16 is arranged to be of a full-bridge type approximately the same as that in Embodiment 2.

An input voltage Vi from input terminals Pi is converted into an arbitrary DC voltage by means of the non-isolated buck-boost converter circuit 15, and an output voltage Vo is outputted by means of the isolated converter circuit 16.

The isolated converter circuit 16 is connected downstream of the non-isolated buck-boost converter circuit 15, and is an isolated converter circuit of a full-bridge type that includes, on the primary side of the transformer 11, the third through sixth semiconductor switching devices 7a, 8a, 7b and 8b, and that includes, on the secondary side of the transformer 11, the diodes 12 and 13 which form a rectifier circuit, the smoothing reactor 18 and the smoothing capacitor 14.

In general, because an isolated converter circuit of a full-bridge type achieves the best efficiency when the third semiconductor switching device 7a and the fourth semiconductor switching device 8a, and the fifth semiconductor switching device 7b and the sixth semiconductor switching device 8b are complementarily turning on and off at fixed frequency and duty ratio of 50% in a similar manner to the isolated converter circuit of Embodiment 2, the control of a buck-boost voltage ratio is not performed in the isolated converter circuit 16, but the control of a buck-boost voltage ratio is performed by means of the non-isolated buck-boost converter circuit 15. According to the manner described above, it is possible to operate the isolated converter circuit 16, without depending on its input and output conditions, under the conditions to achieve its best efficiency.

According to the electric power converter of Embodiment 4 explained above, the isolated converter circuit 16 is made of a full-bridge converter, so that the isolated converter circuit 16 can be configured by a small number of components and circuits with simple connections, and it becomes possible to achieve cost reduction and more compact size.

The non-isolated buck-boost converter circuits 15 and the isolated converter circuits 16 each shown in Embodiments 1 through 4 are not necessarily limited to those combinations, but any one of those combinations may also be suitable for the non-isolated buck-boost converter circuit 15 and the isolated converter circuit 16. In addition, a scheme not shown in Embodiments 1 through 4 may be adopted.

The isolated converter circuit 16 shown in Embodiments 1 through 4 each includes a full-wave rectifier circuit on its secondary side; however, another rectifier circuit (for example, a bridge rectifier circuit) may also be suitable.

Embodiment 5

Figure 18:
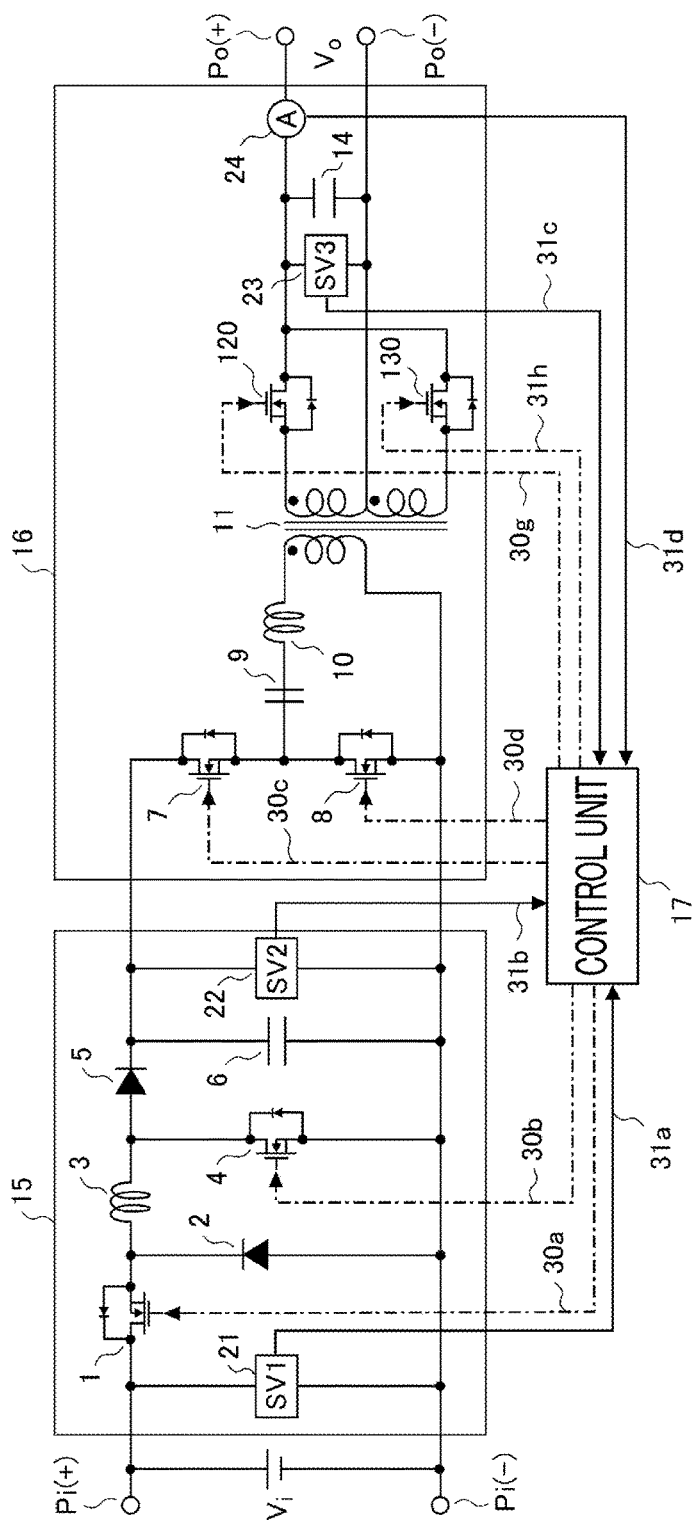
FIG. 18 is a schematic configuration diagram of an electric power converter according to Embodiment 5 of the present invention.

Next, the explanation will be made referring to FIG. 18 through FIG. 20 for an electric power converter according to Embodiment 5 of the present invention. FIG. 18 is a schematic configuration diagram of the electric power converter according to Embodiment 5 of the present invention. The electric power converter according to Embodiment 5 of the present invention includes the non-isolated buck-boost converter circuit 15 and the isolated converter circuit 16; the non-isolated buck-boost converter circuit 15 takes the same circuit configuration as that in Embodiment 1.

Meanwhile, the secondary side rectifier circuit of the transformer 11 in the isolated converter circuit 16 takes a configuration of synchronous rectifier circuit using semiconductor switching devices 120 and 130. Accordingly, a conversion efficiency of the electric power converter can be enhanced at the time of light loading. This is because, on one hand in a diode rectifier circuit, losses are caused due to voltage drops Vf of the diodes (W=Vf×Io) even when electric currents flowing through the diodes are small, but, on the other hand in the synchronous rectification, losses of the semiconductor switching devices 120 and 130 of MOSFETs are proportional to the square of an electric current (W=Ron×Io$^2$), so that electric conduction losses can be mitigated.

Next, the explanation will be made referring to waveforms for basic operations of the isolated converter circuit 16 in Embodiment 5. FIG. 19 is a diagram showing each of the waveforms in the electric power converter according to Embodiment 5.

Figure 19:
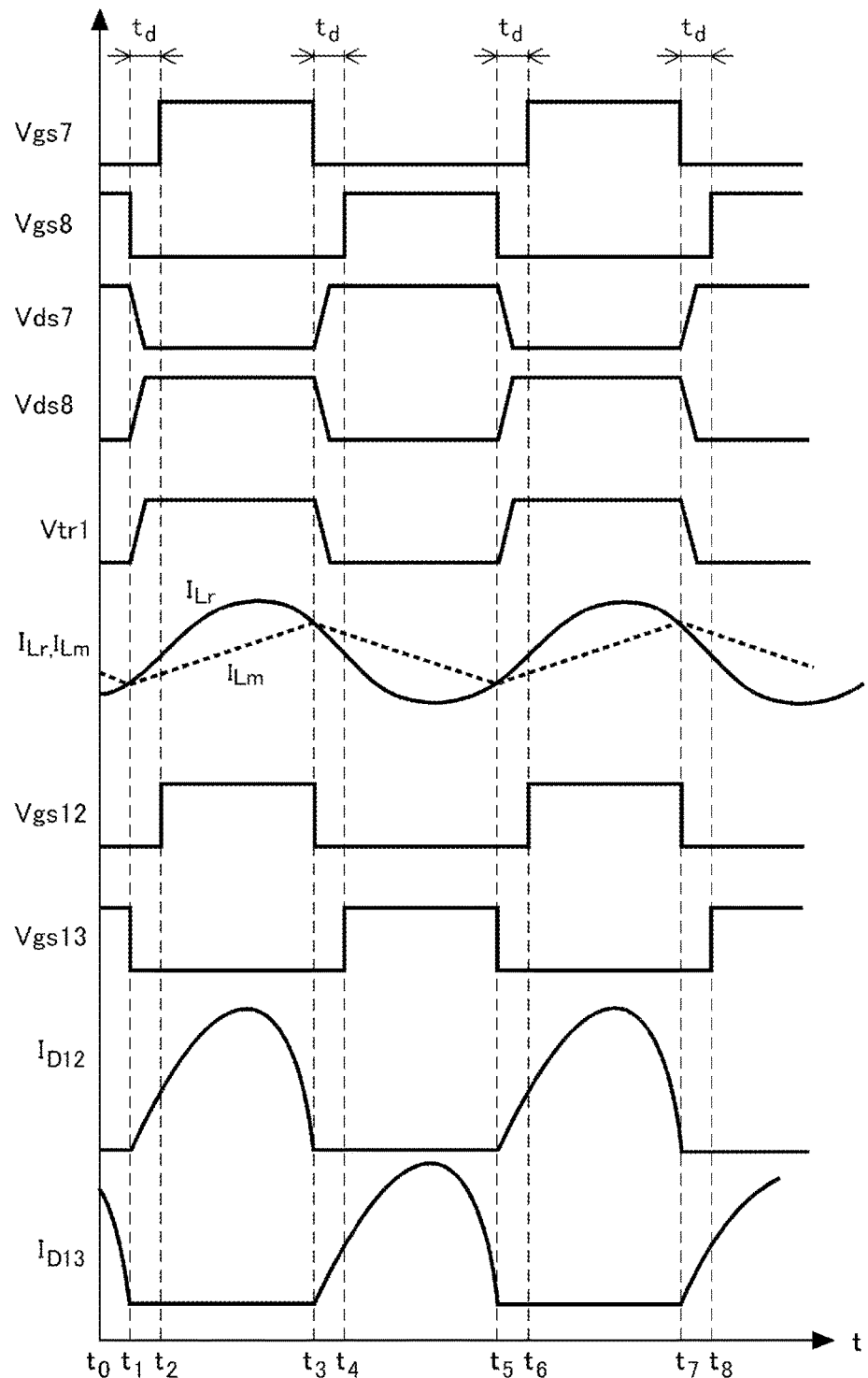
FIG. 19 is an illustrative diagram for explaining each of voltage and current waveforms in operation of an isolated converter circuit in the electric power converter according to Embodiment 5 of the present invention.
Figure 20:
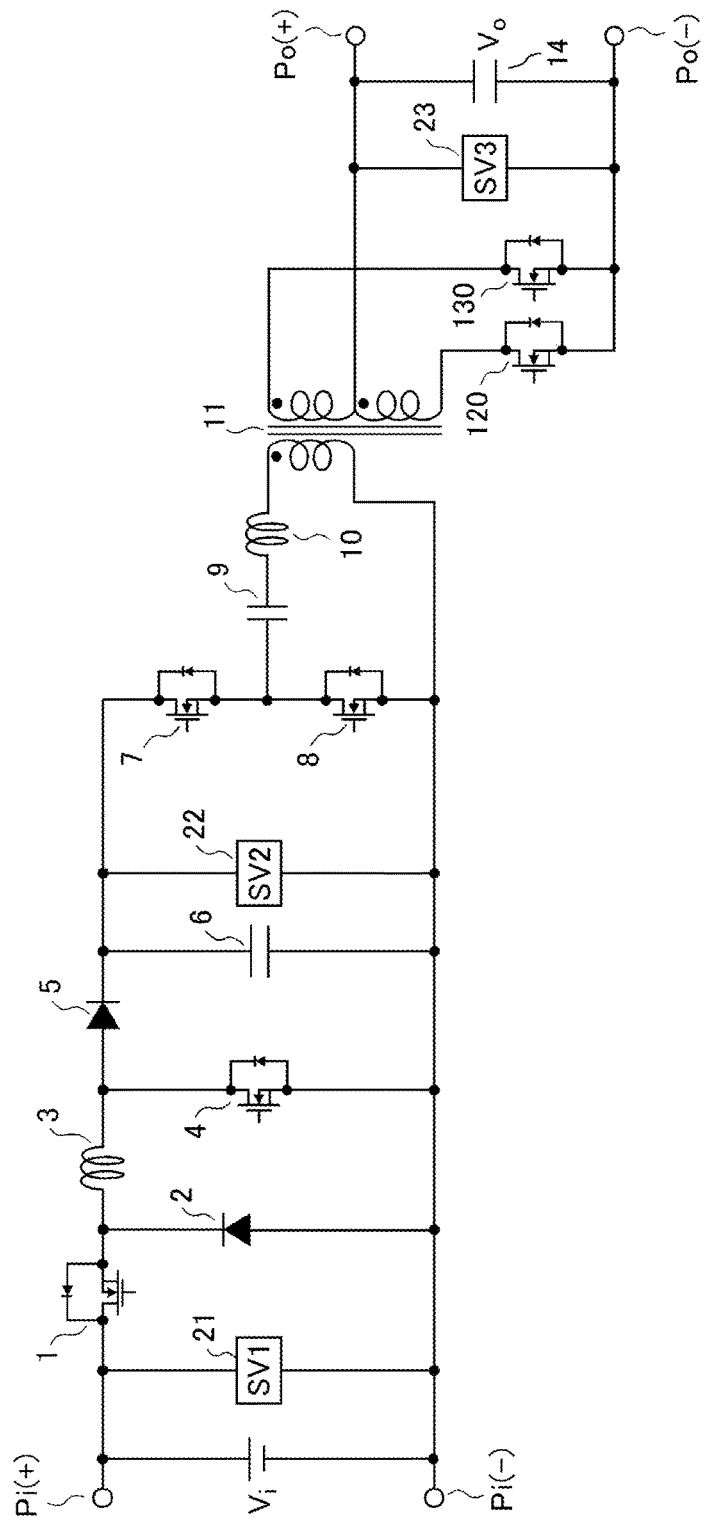
FIG. 20 is a configuration diagram of a modification example of the electric power converter according to Embodiment 5 of the present invention.

FIG. 19 shows each of the waveforms for gate voltages Vgs7 and Vgs8 applied across respective gate-to-sources of the third and fourth semiconductor switching devices 7 and 8, voltages Vds7 and Vds8 applied across respective drain-to-sources of the third and fourth semiconductor switching devices 7 and 8, an electric current flowing through the resonance capacitor 9 and the resonance reactor 10 (a leakage inductance of the transformer 11) $I_{Lr}$ (hereinafter also referred to as a "resonance current"), an exciting current $I_{Lm}$ flowing through an exciting inductance Lm of the transformer 11, a voltage Vtr1 applied on the primary side of the transformer 11, gate voltages Vgs12 and Vgs13 applied across respective gate-to-sources of the semiconductor switching devices 120 and 130, and electric currents $I_{D12}$ and $I_{D13}$ flowing through the respective semiconductor switching devices 120 and 130. Note that, in an electric current flowing through the primary side of the transformer 11, a direction of the current flowing from the resonance capacitor 9 into the transformer 11 is defined as positive.

The control unit 17 puts the turn-on and turn-off control into synchronization between the third semiconductor switching device 7 and the semiconductor switching device 120, and puts the turn-on and turn-off control into synchronization between the fourth semiconductor switching device 8 and the semiconductor switching device 130. In Embodiment 5, as the explanation has been made in Embodiment 1, the control is performed so that half a period of a switching frequency (Tsw/2) is made equal to a time in which a dead time td is added to half a period of a series resonance frequency fsr (Tsr/2) of a series resonance circuit constituted of the resonance reactor 10 and the resonance capacitor 9.

In general, it is recommended to perform the control to equalize in such a manner that a switching frequency fsw≈ a series resonance frequency fsr; however, turn-off losses are caused because a semiconductor switching device turns off ahead of time by the amount of dead time td under actual circumstances. This causes degradation of the efficiency.

In the isolated converter circuit 16 of the electric power converter according to Embodiment 5, the control unit 17 achieves in such a manner that, as described above, the semiconductor switching devices 120 and 130 of the secondary side rectifier circuit can be turned off approximately at 0 A by setting a switching frequency in which a dead time td is taken into consideration; and thus, it is not only possible to reduce turn-off losses, but also possible to suppress surge caused at the times of turn-off, so that a snubber circuit for suppressing the surge can be eliminated. In addition, according to FIG. 19, the ZVS is held on the semiconductor switching devices 120 and 130 because an electric current flows through each of body diodes of the semiconductor switching devices 120 and 130 until immediately before then, and thus a voltage Vds between the drain and source is zero.

Next, the explanation will be made for protective operations of the control unit 17 in a case in which a load voltage increases in the electric power converter according to Embodiment 5. In the electric power converter according to Embodiment 5, the isolated converter circuit 16 is made of a synchronous rectifier configuration, so that, when a voltage-value of output voltage Vo is increased, a voltage produced on the primary side of the transformer 11 due to the switching of the semiconductor switching devices 120 and 130 becomes larger than an output voltage of the non-isolated buck-boost converter circuit 15, and so a backflow phenomenon is caused in which an electric current flows from an output side into an input side. In order to keep this from occurring, the control unit 17 prevents backflow in which an electric current flows back from a side of output voltage Vo by increasing an output voltage of the non-isolated buck-boost converter circuit 15, when the output voltage Vo is increased.

In addition, when an output voltage Vo is increased, it is possible to prevent backflow in which an electric current flows back from a side of output voltage Vo by also implementing that the control unit 17 continuously turns off (halts) the semiconductor switching devices 120 and 130 constituting a synchronous rectifier circuit.

In Embodiment 5, the intermediate tap of the secondary winding of the transformer 11 is connected on the negative side at the output terminals Po, and the respective source terminals of the semiconductor switching devices (MOSFETs) 120 and 130 are connected to both ends on the secondary winding of the transformer 11; however it is not necessarily limited to this. It may also be adopted to configure as a modification example that, for example, the intermediate tap is connected on the positive side at the output terminals Po, and the respective drain terminals of the semiconductor switching devices (MOSFETs) 120 and 130 are connected to both the ends on the secondary winding of the transformer 11 as shown in FIG. 20.

According to the electric power converter of Embodiment 5 explained above, the rectifier circuit of the isolated converter circuit 16 is made of a synchronous rectifier circuit by means of the semiconductor switching devices, so that increased efficiency can be achieved by lowering losses due to voltage drops of a diode rectifier circuit to losses due to electric conduction losses of the semiconductor switching devices.

In addition, backflow of a synchronous rectifier circuit occurs when an output voltage of the isolated converter circuit 16 increases, so that surge voltages are produced because the semiconductor switching devices 120 and 130 result in hard switching; however, at this time, the backflow of the synchronous rectifier circuit can be prevented by increasing an output voltage of the non-isolated buck-boost converter circuit 15.

Moreover, when the output voltage of the isolated converter circuit 16 is increased, it is possible to prevent the backflow by turning off the semiconductor switching devices 120 and 130.

Embodiment 6

Figure 21:
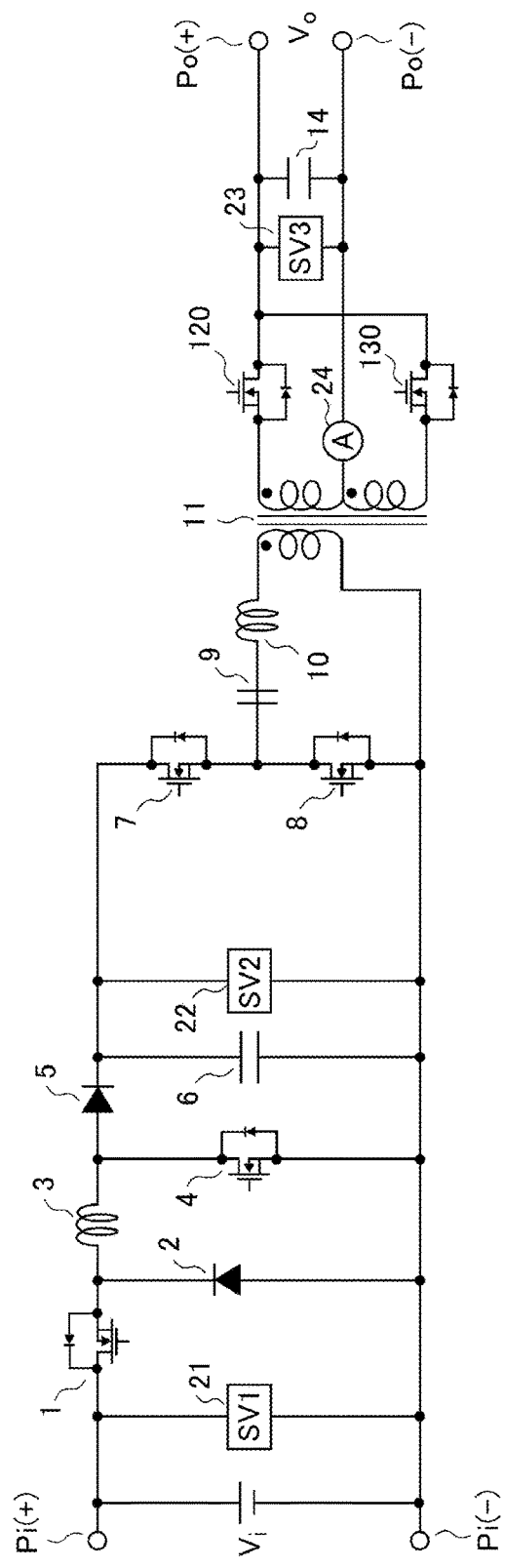
FIG. 21 is a schematic configuration diagram of an electric power converter according to Embodiment 6 of the present invention.

Next, the explanation will be made referring to FIG. 21 for an electric power converter according to Embodiment 6 of the present invention. FIG. 21 is a schematic configuration diagram of the electric power converter according to Embodiment 6. In the electric power converter according to Embodiment 6 of the present invention, the output-current detection circuit 24 is connected so that an electric current value flowing through the secondary winding of the transformer 11 is acquired, in addition to the circuits explained in Embodiment 5.

Note that, in FIG. 21, omitted are the control unit 17, the control lines 30*a*, 30*b*, 30*c*, 30*d*, 30*g* and 30*h* for performing turn-on and turn-off controls of the respective semiconductor switching devices 1, 4, 7, 8, 120 and 130 by means of the control unit 17, and the signal lines 31*a*, 31*b*, 31*c* and 31*d* inputted from the respective detection circuits 21, 22, 23 and 24 for an input voltage or the like, because these are the same as those in FIG. 18.

According to the control methods explained in Embodiments 1 and 6, it is possible also in the present invention according to Embodiment 6 to output a stable voltage in high efficiency in such a range that an input voltage range is wide. However, a series resonance frequency fsr actually changes due to degradation by age change and temperature change, and also due to changes in the capacitance of the resonance capacitor 9 and in the inductance of the resonance reactor 10 being a leakage inductance of the transformer 11. For this reason, operation waveforms of electric currents $I_{D12}$ and $I_{D13}$ flowing through the semiconductor switching devices 120 and 130 explained for those in FIG. 19 change as shown by the solid lines in FIG. 22, respectively. The broken lines in FIG. 22 show the operation waveforms of the electric currents $I_{D12}$ and $I_{D13}$ in FIG. 19.

Figure 22:
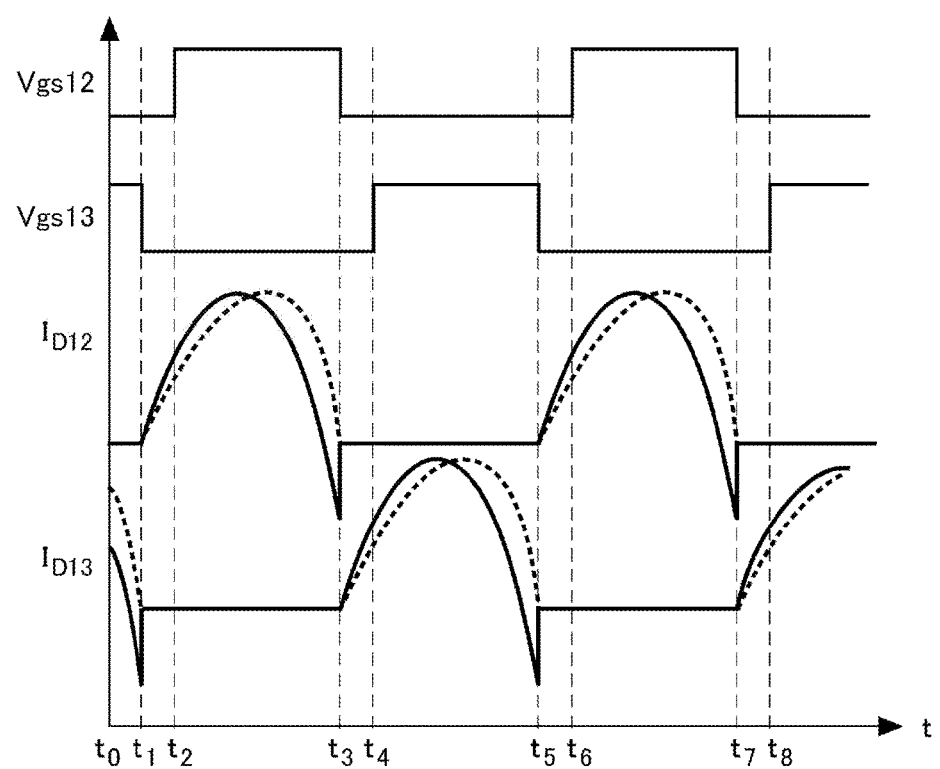
FIG. 22 is an illustrative diagram for explaining each of voltage and current waveforms in a case in which a series resonance frequency changes due to degradation by age change and temperature change in the electric power converter according to Embodiment 6 of the present invention.

For example, FIG. 22 shows a case in which a series resonance frequency fsr increases due to reduction in the capacitance of the resonance capacitor 9, or reduction in the inductance of the resonance reactor 10 (or both of them). Due to the electric currents $I_{D12}$ and $I_{D13}$ flowing through the respective semiconductor switching devices 120 and 130 in FIG. 21, a resonance current results in being reversed (currents flow from the drains to the sources) in the synchronous rectification, when a series resonance frequency fsr increases. Accordingly, switching losses are not only caused at the times of turn-off, but surge is also increased.

In order to solve this described above, in the electric power converter explained in Embodiment 6, the control unit 17 not only controls turn-on and turn-off timings of the semiconductor switching devices 120 and 130 to synchronize with the respective third and fourth semiconductor switching devices 7 and 8, but also controls so that the semiconductor switching device 120 or the semiconductor switching device 130 is turned off at the instant at which an electric current value detected by means of the output-current detection circuit 24 falls below a threshold value.

According to this arrangement, because the semiconductor switching devices 120 and 130 acts as diodes at the times of turn-off, the turn-off can be achieved at 0 A, so that switching losses are not caused, and surge can also be mitigated.

Figure 23:
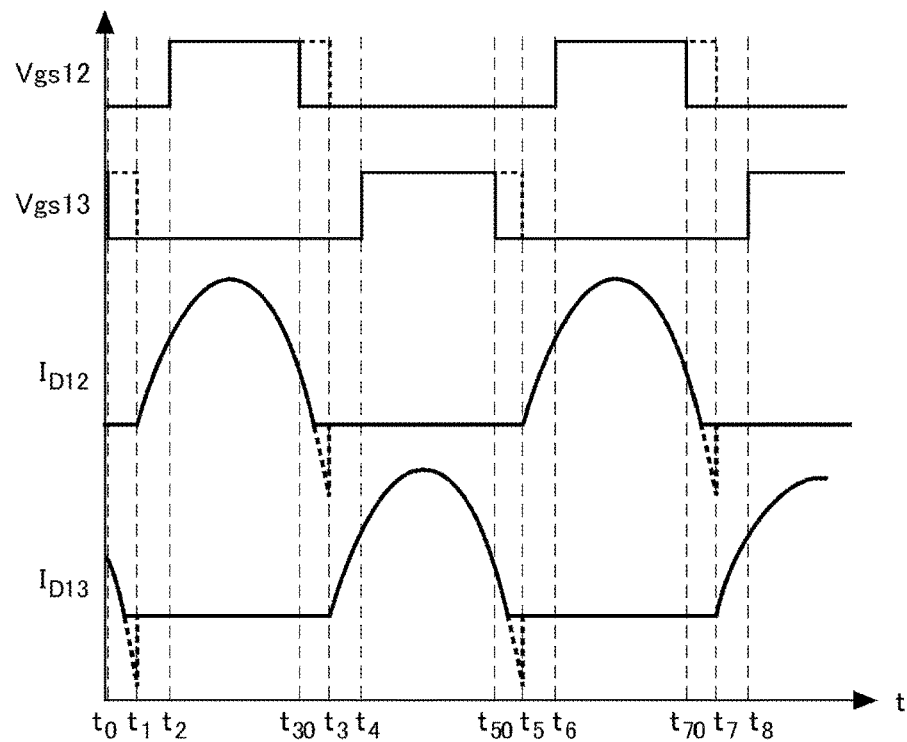
FIG. 23 is an illustrative diagram for explaining each of voltage and current waveforms in operation of an isolated converter circuit in the electric power converter according to Embodiment 6 of the present invention.

In FIG. 23, shown are operation waveforms of gate voltages Vgs12 and Vgs13 applied across the respective gate-to-sources of the semiconductor switching devices 120 and 130, and of electric currents $I_{D12}$ and $I_{D13}$ flowing through the semiconductor switching devices 120 and 130 in Embodiment 6.

The solid lines in FIG. 23 show the cases in Embodiment 6 in which the control unit 17 turns off the semiconductor switching devices 120 and 130 at timings when an electric current value detected by the output-current detection circuit 24 falls below a threshold value. Meanwhile, the broken lines show the operation waveforms when the surge of FIG. 22 is caused. Note that, timings of turn-off for the semiconductor switching devices 120 and 130 are best performed when an electric current reaches 0 A; however, a threshold value is assigned therefor because it is not possible to turn off exactly at 0 A due to variations of sensors, delays in gate signals, etc., in practice.

In Embodiment 6, the isolated converter circuit 16 is an LLC converter; however, it is not necessarily limited to this. Another isolated converter may also be applicable therefor.

In addition, in Embodiment 6, the non-isolated buck-boost converter circuit 15 is of the H-bridge type; however, it is not necessarily limited to this. Another non-isolated buck-boost converter circuit may also be suitable.

In Embodiment 6, the explanation has been made in which, by monitoring an electric current value of the output-current detection circuit 24, the control unit 17 turns off the semiconductor switching devices 120 and 130; however, it is not necessarily limited to this. For example, using a comparator, the control may be performed by hardware so that the semiconductor switching devices 120 and 130 are turned off at the instant at which an electric current value of the output-current detection circuit 24 falls below a threshold value.

In addition, in order to monitor electric currents flowing through the semiconductor switching devices 120 and 130, an electric current sensor is placed as the output-current detection circuit 24 on the secondary side of the transformer 11; however, it is not necessarily limited to this. It may be adopted that, for example, an electric current sensor is placed on the primary side of the transformer 11, and a secondary side current of the transformer 11 is estimated from a resonance current flowing through the primary side of the transformer 11.

In addition, in Embodiment 6, the intermediate tap of the secondary winding of the transformer 11 is connected on the negative side at the output terminals Po, and the respective source terminals of the semiconductor switching devices (MOSFETs) 120 and 130 are connected to both ends on the secondary winding of the transformer 11; however, it is not necessarily limited to this. It may also be adopted to configure that, for example, the intermediate tap is connected on the positive side at the output terminals Po, and the respective drain terminals of the semiconductor switching devices (MOSFETs) 120 and 130 are connected to both the ends on the secondary winding of the transformer 11 (omitted to show in the figure).

Moreover, in Embodiment 6, the output-current detection circuit 24 is provided at a position of the intermediate tap of the secondary winding of the transformer 11; however, it is not necessarily limited to this. It may also be adopted that respective electric current sensors are provided in series for each of the semiconductor switching devices 120 and 130.

According to the electric power converter of Embodiment 6 explained above, the isolated converter circuit 16 is provided with an electric current sensor circuit (output-current detection circuit 24) for sensing an electric current flowing through a synchronous rectifier circuit, and the control unit 17 performs the turn-off when an electric current flowing through the synchronous rectifier circuit reaches less than or equal to a threshold value. According to the arrangement, increased efficiency can be achieved by preventing backflow and also by increasing the times of synchronous rectification as much as possible.

Embodiment 7

Next, the explanation will be made for an electric power converter according to Embodiment 7 of the present invention. The electric power converter according to Embodiment 7 takes the same circuit configuration as that in Embodiment 6. Similarly to Embodiment 6, this embodiment is directed at the problems in that, due to degradation by age change and temperature change, and also due to changes in the capacitance of the resonance capacitor 9 and in the inductance of the resonance reactor 10, switching losses are caused at turn-off times of the semiconductor switching devices 120 and 130 in a case in which a series resonance frequency fsr changes, and in that surge increases.

In Embodiment 6, controlling means and circuits are provided so that timings to turn off the semiconductor switching devices 120 and 130 are set to turn off them at timings when an output current falls below a threshold value; however, in Embodiment 7, by increasing or decreasing a switching frequency for the third and fourth semiconductor switching devices 7 and 8 of the isolated converter circuit 16, the semiconductor switching devices 120 and 130 adjusted to turn off in vicinity to 0 A.

Because of a series resonance frequency fsr which undergoes changes, operation waveforms of the electric power converter change as shown in FIG. 22. At this time, the control unit 17 acquires a value of the output-current detection circuit 24 at timings when the semiconductor switching devices 120 and 130 turn off. At this time, the control unit 17 increases or decreases a switching frequency when the electric current value is more distant from 0 A in a certain predetermined range.

For example, in a case of FIG. 22, the control unit 17 increases the switching frequency. Accordingly, it is possible to achieve the turn-off in vicinity to 0 A, because the switching frequency fsw approaches a series resonance frequency fsr. On the contrary also when electric currents of the semiconductor switching devices 120 and 130 are turned off before reaching 0 A, the control unit 17 decreases the switching frequency. According to these arrangements, it is possible to achieve those effects similar to the effects described in Embodiment 6.

In Embodiment 7, in order to reduce turn-off losses of the semiconductor switching devices 120 and 130 and to mitigate their surge, an electric current sensor circuit (output-current detection circuit 24) is provided, and the circuitry is arranged so that the semiconductor switching devices 120 and 130 turn off in vicinity to 0 A by increasing or decreasing their switching frequency; however, it is not necessarily limited to this. It may also be adopted that, for example, an electric power converter includes a temperature sensor thereinside (not shown in the figures), and that the control unit 17 stores, as a function, a value of a series resonance frequency fsr which changes due to a temperature change, and alters the switching frequency fsw in accordance with a monitored value of the temperature sensor.

According to the electric power converter of Embodiment 7 explained above, the control unit 17 monitors a resonance current of the isolated converter circuit 16 being an LLC resonance converter, and adjusts a switching frequency fsw in following with a series resonance frequency fsr. According to the arrangement, it is possible to operate the isolated converter circuit 16 in high efficiency.

Moreover, the control unit 17 monitors temperature information, and adjusts the switching frequency fsw by predicting the series resonance frequency fsr. According to this, it is possible to operate the isolated converter circuit 16 in high efficiency.

Embodiment 8

Figure 24:
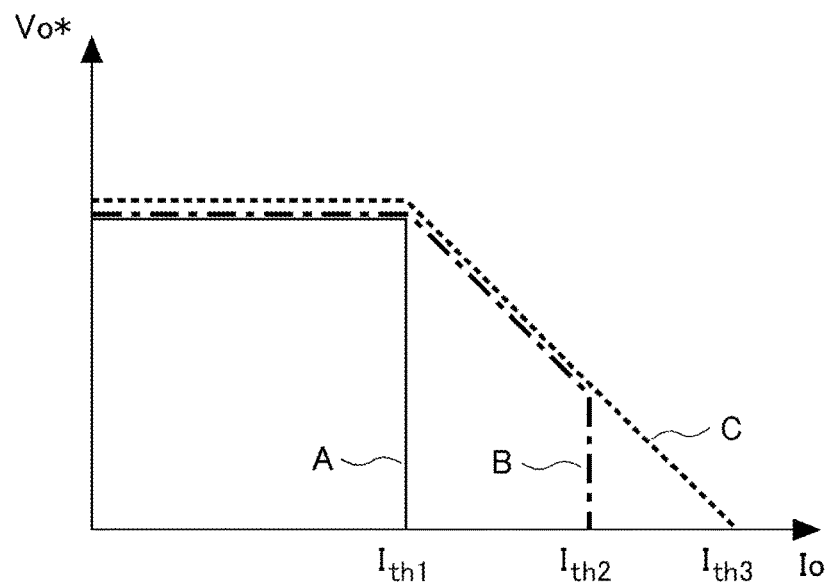
FIG. 24 is a characteristic diagram illustrating the relationship between an output current and a target value of an output voltage in an electric power converter according to Embodiment 8 of the present invention.

Next, the explanation will be made for an electric power converter according to Embodiment 8 of the present invention. The electric power converter according to Embodiment 8 takes the same circuit configuration as that in Embodiment 6. In order not to destroy this electric power converter by outputting therefrom electric power not less than rated electric power, the electric power converter takes an output current Io into the control unit 17 by means of the output-current detection circuit 24, and controls by means of the control unit 17 so that, using a low-pass filter or the like of the control unit, an alternating current component of the output current Io is removed to make it a direct current value, and a target output-voltage value Vo* is lowered, thereby the output voltage Vo is decreased, when an output current Io flows more than or equal to a threshold value as shown in FIG. 24. The output current Io in FIG. 24 designates a direct current value in which an alternating current component is removed by a low-pass filter or the like of the control unit. As for the manner to lower a target output-voltage value Vo*, various patterns are conceivable: a pattern A in which a target output-voltage value Vo* is maintained until a threshold value $I_{th1}$, and is set to 0 [V] at the threshold value $I_{th1}$; a pattern B in which a target output-voltage value Vo* is maintained until the threshold value $I_{th1}$ and started gradually descending from the threshold value $I_{th1}$, and is set to 0 [V] at a threshold value $I_{th2}$; a pattern C in which a target output-voltage value Vo* is maintained until the threshold value $I_{th1}$ and started gradually descending from the threshold value $I_{th1}$, and is set to gradually descend toward a threshold value $I_{th3}$ to reach 0 [V]; and the like.

In Embodiment 8, a target output-voltage value Vo* is decreased in accordance with the output current Io; however, similar effects can be obtained by lowering the target output-voltage value Vo* in accordance with an electric current at a different point of the electric power converter.

In addition, the non-isolated buck-boost converter circuit 15 and the isolated converter circuit 16 described in Embodiment 8 are not necessarily limited to the combination, but any of those combinations described above may also be suitable for the non-isolated buck-boost converter circuit 15 and the isolated converter circuit 16. In addition, a scheme not shown in this description may be adopted.

The isolated converter circuit 16 shown in Embodiment 8 includes a full-wave rectifier circuit on its secondary side; however, another rectifier circuit (for example, a bridge rectifier circuit) may also be suitable.

According to the electric power converter of Embodiment 8 explained above, the control unit 17 controls so that a target output-voltage value Vo* is lowered by sensing an output current Io by means of the output-current detection circuit 24 and by removing an alternating current component of the output current Io using a low-pass filter or the like of the control unit, thereby the output voltage Vo is decreased, when an output current Io flows more than or equal to a threshold value as shown in FIG. 24. According to the arrangement, it is possible to make the electric power converter not to be destroyed by outputting therefrom electric power not less than rated electric power.

In each of the embodiments described above, the semiconductor switching devices are made of MOSFETs; however, it is not necessarily limited to these. For example, IGBTs may also be suitable.

In each of the embodiments described above, the smoothing capacitor 14 is connected between the output terminals Po downstream of a rectifier circuit in parallel therewith; however, it is not necessarily limited to this. For example, when such a load of a large capacity component as a lead-acid battery or the like is connected at the output-circuit portion, it is not required to connect the capacitor.

In each of the embodiments described above, the isolated converter circuit 16 takes a half-bridge configuration using two semiconductor switching devices; however, it is not necessarily limited to this. For example, a full-bridge configuration may also be suitable.

In each of the embodiments described above, semiconductor switching devices used for the electric power converter are not necessarily limited to semiconductor switching devices made of a silicon (Si) semiconductor; for example, the semiconductor switching devices may also be suitable when they are made of a non-Si semiconductor material whose band-gap is wider than a Si semiconductor. In addition, as a wide band-gap semiconductor being a non-Si semiconductor material, there is, for example, silicon carbide, a gallium nitride-based material, or diamond.

A semiconductor switching device made of a wide band-gap semiconductor can be used in high voltage region in which unipolar operations are difficult to be performed using a Si semiconductor, so that switching losses caused at the times of switching can be significantly reduced, and so electric power losses can be substantially reduced. In addition, electric power losses are small, and heat resistance is also high, so that, when a power module(s) is constituted to include a cooling portion, it becomes possible to achieve even more compact size of a semiconductor module(s) because more compact size can be achieved on a radiating fin(s) of a heat sink, and a water-cooling portion can be replaced to undergo air-cooling. In addition, a semiconductor switching device made of a wide band-gap semiconductor is suitable for high-frequency switching operations; when the application to a converter circuit is achieved where requirements for higher frequency application are demanding, a reactor(s), a capacitor(s) and the like connected to a converter circuit(s) can also be small-sized because of the higher frequency application to the switching frequency. Therefore, similar effects can be achieved when the semiconductor switching devices in each of the embodiments described above are constituted of semiconductor switching devices made of a wide gap semiconductor such as silicon carbide or the like.

Hereinbefore, the embodiments of the present invention are described; however, the present invention is not necessarily limited to those embodiments, and so various design modifications can be pursued, thereby each of the embodiments can be freely combined, and/or each of the embodiments can be appropriately modified or eliminated without departing from the scope of the invention.

Figure 25:
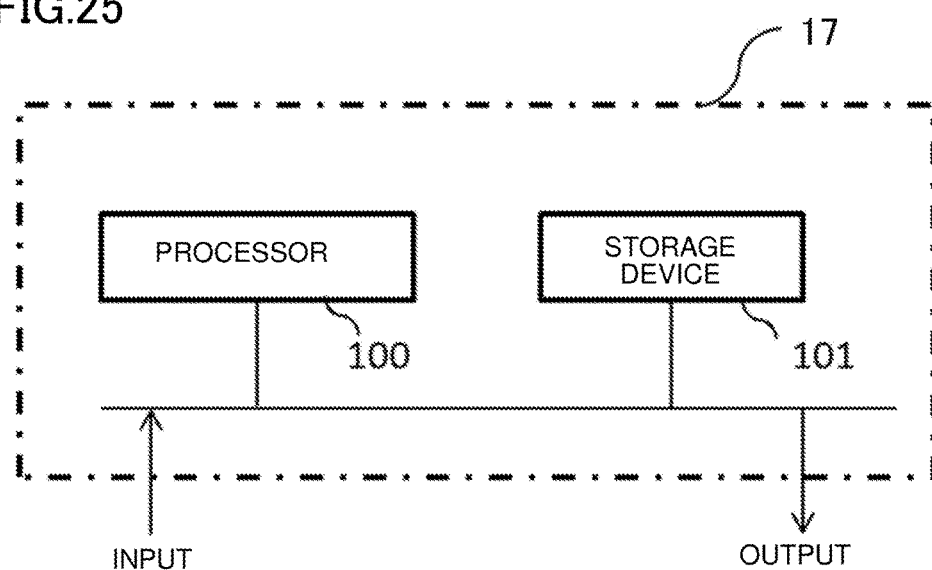
FIG. 25 shows an example of hardware of the control unit.

FIG. 25 shows an example of hardware of the control unit 17. The control unit 17 is composed of a processor 100 and a storage unit 101 as shown in FIG. 25. The storage unit 101 includes, although not shown, a volatile storage device such as a random access memory, and a nonvolatile auxiliary storage device such as a flash memory. The storage unit 101 may include, instead of a flash memory, an auxiliary storage device such as a hard disk. The processor 100 executes a program loaded from the storage unit 101. In this case, the program is loaded from the auxiliary storage device to the processor 100 via the volatile storage device. The processor 100 may output data of the calculation result and the like to the volatile storage device of the storage unit 101, or may store the data in the auxiliary storage device via the volatile storage device.

What is claimed is:

1. An electric power converter, comprising:
   a non-isolated buck-boost converter circuit for outputting, by increasing or decreasing a voltage being inputted thereinto, a DC voltage;
   an isolated converter circuit for outputting a DC voltage to a load by inputting a DC voltage outputted from the non-isolated buck-boost converter circuit, wherein the isolated converter circuit includes a transformer having a primary winding and a secondary winding, and wherein a resonance type converter is configured to connect a third semiconductor switching device, a fourth semiconductor switching device and a resonance capacitor to the primary winding of the transformer; and
   a control device for controlling the non-isolated buck-boost converter circuit and the isolated converter circuit, wherein the control unit is configured to control a switching frequency of a waveform applied to the third semiconductor switching device based on a value of the resonance capacitor.

2. The electric power converter as set forth in claim 1, wherein the control device performs a control of a buck-boost voltage ratio, by only the non-isolated buck-boost converter circuit, between a voltage being inputted thereinto and an output voltage of the isolated converter circuit.

3. The electric power converter as set forth in claim 1, wherein the non-isolated buck-boost converter circuit includes an H-bridge type buck-boost chopper having a first smoothing reactor, a first smoothing capacitor, two diodes, a first semiconductor switching device for controlling an application time of an input voltage into the first smoothing reactor, and a second semiconductor switching device for controlling a DC voltage stored in the first smoothing capacitor.

4. The electric power converter as set forth in claim 3, wherein the control device turns off the second semiconductor switching device at all times and controls a buck voltage ratio by means of the first semiconductor switching device when the non-isolated buckboost converter circuit is controlled to perform a buck operation on an input voltage thereinto, and turns on the first semiconductor switching device at all times and controls a boost voltage ratio by means of the second semiconductor switching device when the non-isolated buck-boost converter circuit is controlled to perform a boost operation on an input voltage thereinto.

5. The electric power converter as set forth in claim 3, wherein the control device turns on the first semiconductor switching device at all times and turns off the second semiconductor switching device at all times, when a buck-boost voltage ratio of the non-isolated buck-boost converter circuit is one.

6. The electric power converter as set forth in claim 1, wherein
the isolated converter circuit includes
a rectifier circuit and a second smoothing capacitor connected to the secondary winding of the transformer.

7. The electric power converter as set forth in claim 6, wherein a rectifier circuit of the isolated converter circuit is constituted of diodes.

8. The electric power converter as set forth in claim 6, wherein a rectifier circuit of the isolated converter circuit is a synchronous rectifier circuit constituted of semiconductor switching devices.

9. The electric power converter as set forth in claim 8, wherein the control unit increases an output voltage of the non-isolated buck-boost converter circuit, when an output voltage of the isolated converter circuit increases.

10. The electric power converter as set forth in claim 8, wherein the control unit halts the synchronous rectifier circuit of the isolated converter circuit, when an output voltage of the isolated converter circuit increases.

11. The electric power converter as set forth in claim 8, wherein the isolated converter circuit includes an output-current detection circuit for detecting an electric current flowing through the synchronous rectifier circuit, and the control unit turns off the synchronous rectifier circuit when an electric current detected by the output-current detection circuit reaches less than or equal to a threshold value.

12. The electric power converter as set forth in claim 6, wherein the resonance reactor of the isolated converter circuit is made of a leakage inductance of the transformer having a primary winding and a secondary winding.

13. The electric power converter as set forth in claim 6, wherein the isolated converter circuit comprises an LLC converter.

14. The electric power converter as set forth in claim 13, wherein the switching frequency is a fixed switching frequency.

15. The electric power converter as set forth in claim 14, wherein the control unit controls to make a time of half a period of the fixed switching frequency equal to a time in which a dead time is added to half a period of a series resonance frequency determined between the resonance capacitor and the resonance reactor.

16. The electric power converter as set forth in claim 14, further comprising
a temperature sensor, wherein
the control unit controls a switching frequency of the LLC converter in accordance with a temperature value detected by the temperature sensor.

17. The electric power converter as set forth in claim 14, wherein the isolated converter circuit includes an output-current detection circuit for detecting an electric current flowing through an output circuit, and the control unit controls a switching frequency of the LLC converter in accordance with an electric current value detected by the output-current detection circuit.

18. The electric power converter as set forth in claim 1, further comprising
an electric current sensor, wherein
the control unit lowers a target value of an output voltage of the electric power converter in accordance with an electric current value detected by the electric current sensor.

19. The electric power converter as set forth in claim 18, wherein a semiconductor switching device of the electric power converter is a device made of a wide band-gap semiconductor.

20. The electric power converter as set forth in claim 19, wherein the wide band-gap semiconductor is a semiconductor using silicon carbide, a gallium nitride-based material, or diamond.

21. An electric power converter, comprising:
a non-isolated buck-boost converter circuit for outputting, by increasing or decreasing a voltage being inputted thereinto, a DC voltage, wherein the non-isolated buck-boost converter circuit includes a polarity reversal type buck-boost chopper having a first smoothing reactor, a first smoothing capacitor, a diode, and a first semiconductor switching device configured such that a second polarity on the first smoothing capacitor appears reversed with respect to a first voltage polarity on the input of the non-isolated buck-boost converter circuit;
an isolated converter circuit for outputting a DC voltage to a load by inputting a DC voltage outputted from the non-isolated buck-boost converter circuit; and
a control device for controlling the non-isolated buck-boost converter circuit and the isolated converter circuit.

22. The electric power converter as set forth in claim 21, wherein the control device turns off the first semiconductor switching device when the electric power converter does not transmit electric power to a load.

23. The electric power converter as set forth in claim 21, wherein
the isolated converter circuit includes a transformer having a primary winding and a secondary winding; and
a full-bridge converter is configured to connect a third semiconductor switching device, a fourth semiconductor switching device, a fifth semiconductor switching device and a sixth semiconductor switching device to the primary winding of the transformer, and to connect a rectifier circuit and a second smoothing reactor to the secondary winding of the transformer.

* * * * *